US012038163B1

(12) United States Patent
Cohen

(10) Patent No.: US 12,038,163 B1
(45) Date of Patent: Jul. 16, 2024

(54) FIRE RATED HOUSING FOR LIGHTING

(71) Applicant: AMP Plus, Inc., Vernon, CA (US)

(72) Inventor: Brandon Cohen, Vernon, CA (US)

(73) Assignee: AMP Plus, Inc., Vernon, CA (US)

( * ) Notice: Subject to any disclaimer, the term of this patent is extended or adjusted under 35 U.S.C. 154(b) by 0 days.

(21) Appl. No.: 18/214,148

(22) Filed: Jun. 26, 2023

Related U.S. Application Data

(63) Continuation of application No. 17/695,764, filed on Mar. 15, 2022, now Pat. No. 11,686,463.

(51) Int. Cl.
*F21V 25/12* (2006.01)
*F21S 8/02* (2006.01)
*F21V 29/50* (2015.01)
*F21Y 115/10* (2016.01)

(52) U.S. Cl.
CPC ............ *F21V 25/125* (2013.01); *F21S 8/026* (2013.01); *F21V 29/50* (2015.01); *F21Y 2115/10* (2016.08)

(58) Field of Classification Search
CPC ........ F21V 25/125; F21V 29/50; F21S 8/026; F21Y 2115/10
See application file for complete search history.

(56) References Cited

U.S. PATENT DOCUMENTS 6,105,334 A * 8/2000 Monson .................. F21V 25/00 52/28
6,226,939 B1 * 5/2001 Atkins .................... F21S 8/026 52/39
7,470,048 B2 * 12/2008 Wu ........................... F21S 8/02 362/147
8,333,490 B2 * 12/2012 Wu ......................... F21V 25/12 362/147
2007/0109796 A1 * 5/2007 Johnson .................. F21S 8/026 362/276
2007/0206374 A1 * 9/2007 Petrakis .................. F21V 25/00 362/147
2008/0165545 A1 * 7/2008 O'Brien .................. F21V 29/15 362/364
2015/0354805 A1 * 12/2015 Chou .................... F21V 21/047 362/147
2023/0020307 A1 * 1/2023 Smith .................. F21V 21/045

FOREIGN PATENT DOCUMENTS

EP 2484968 A1 * 8/2012 ................ F21S 8/02

* cited by examiner

*Primary Examiner* — Erin Kryukova
(74) *Attorney, Agent, or Firm* — Eric Kelly

(57) ABSTRACT

A fire rated lighting housing (can) has: (a) a bottom that is open; (b) a top that is at least mostly closed or entirely closed; (c) a sidewall that runs from the bottom to the top; and (d) a fire-retarding material that is physically touching at least some portion of the sidewall when the sidewall is in a cool-state. The cool-state is when a temperature of the housing is at or below a predetermined normal operating temperature for the housing. This fire rated lighting housing, with the fire-retarding material, is configured to slow a fire from a lower floor reaching an above located adjacent floor with a minimum predetermined fire rating, which may be at least one (1) hour or more. Additionally, the top and the sidewall at least mostly enclose an internal-volume that is configured to directly house a light emitting element, like a LED (light emitting diode).

15 Claims, 26 Drawing Sheets

FIRE RATED HOUSING FOR LIGHTING

PRIORITY NOTICE

The present patent application is a continuation of U.S. non-provisional patent application number 17/695,764 filed on Mar. 15, 2022, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to lighting housings/cans and more specifically to lighting housings/cans that are physically associated with one or more fire-retarding material(s) and/or for achieving a minimum predetermined fire rating.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

At least some building codes and/or the like may require fire mitigating means deployed between different but adjacent floors (e.g., a first floor and a second floor; a lower floor and an immediately located above floor, etc.) to at least slow the spread of fire from a lower floor to a next adjacent above floor. For example, such building codes require that it should take a fire breaking out on a lower floor to take at least two hours to reach the immediately above located floor, wherein this is the “two (2) hour rating.” Often this two (2) hour rating may be accomplished by layering two layers of at least ⅝ (five-eights) inch (or thicker) drywall between those two adjacent floors (i.e., the ceiling of the lower floor may be comprised of two layers of at least ⅝ inch [or thicker] drywall). However, when ceiling lights (recessed lights) are installed in the ceiling, the ceiling lights necessarily create holes in that ceiling drywall, which without some additional mechanism would defeat the two (2) hour rating by creating pathways for fire migration. To alleviate that concern, ceiling light fixtures, where a two (2) hour rating is required, may also need to have at least that same two (2) hour rating.

Much of the prior art of fire prevention and/or fire mitigation techniques for recessed lighting (ceiling lights) were largely directed to the reflectors (trim). Also, many of these reflectors were integral with a trim portion, such that the given reflector could be referred to as a reflector or as a trim. For example, fire prevention and/or fire mitigation techniques being largely directed to the reflectors (trim) appears to have the approach in prior art U.S. utility patents 7320536, 9512994, 9752765, 9784443, and 9890944.

U.S. utility patent 7320536 had an intumescent annular band layer on an exterior portion of his reflector (trim).

U.S. utility patents 9512994, 9752765, and 9784443 had an intumescent disc that was located inside a bottom of his lighting housing/can.

U.S. utility patents 9512994, 9752765, and 9784443 had an intumescent ring (collar) located at a bottom outside of his lighting housing/can.

U.S. utility patent 9890944 had an intumescent collar and intumescent flat disc on bottom exterior of his trim.

Whereas, U.S. utility patent 7670033 took a different approach, with his intumescent layer located on an inside top of an outermost enclosure, wherein that outermost enclosure housed a lighting can within. That is, U.S. utility patent 7670033 added an entirely additional enclosure that covers over the lighting can; and it is this outermost enclosure that has his intumescent layer located on the inside top of this outermost enclosure. This intumescent layer that is located above the top of the inner lighting can is generally not located close to the hottest portions of the light fixture, whether that fixture is the older incandescent and/or hot filament-based light emitting elements or LED based.

It would be desirable to physically associate a fire-retarding material with a lighting housing/can in a cool-state (non-fire state) as opposed to associating the fire-retarding material with the trim/reflector. A problem with associating a fire-retarding material with a trim/reflector of a lighting housing/can, is that if that trim (and/or associated reflector) components get changed out in the future (e.g., in a remodel) a fire rating for that originally installed lighting housing/can may be damaged, reduced, and/or lost entirely.

It would be desirable to at least physically associate a fire-retarding material with particular regions of a lighting housing/can that are closest to internally located one or more of: a driver, a LED chip (or other light source type), and/or a heat sink, in the cool-state (non-fire state); as opposed to associating the fire-retarding material with the trim/reflector.

There is a need in the art for a lighting housing/can with such physically associated fire-retarding material(s).

It is to these ends that the present invention has been developed.

BRIEF SUMMARY OF THE INVENTION

To minimize the limitations in the prior art, and to minimize other limitations that will be apparent upon reading and understanding the present specification, the present invention describes a fire rated lighting housing (can). In some embodiments, the housing/can may comprise: (a) a bottom that is open; (b) a top that is at least substantially (mostly) closed or entirely closed; (c) a sidewall that runs from the bottom to the top; and (d) a fire-retarding material that is physically touching at least some portion of the sidewall when the sidewall is in a cool-state (non-fire state). In some embodiments, the cool-state (non-fire state) may be when a temperature of the housing is at or below a predetermined normal operating temperature for the housing. In some embodiments, this fire rated lighting housing, with the fire-retarding material, may be configured to slow a fire from a lower floor reaching an above located adjacent floor with a minimum predetermined fire rating; such as, but not limited to, at least two (2) hours, at least one (1) hour, or some other predetermined fire rating. In some embodiments, the predetermined fire rating for this fire rated lighting housing/can may be at least two (2) hours, at least one (1) hour, or some other predetermined fire rating. In some embodiments, the top and the sidewall may at least substantially (mostly) enclose an internal-volume. In some embodiments, this internal-volume of the fire rated lighting housing/can may be configured to directly house lighting related electronics, such as, but not limited to, at least one light emitting element, at least one driver, at least one heat sink, at least one reflector, portions thereof, combinations thereof, and/or the like. In some embodiments, the at least one light emitting element may be at least one light emitting diode (LED) and/or some other type of light emitting device/element.

It is an objective of the present invention to provide a lighting housing/can that is physically touching at least one fire-retarding material.

It is another objective of the present invention provide a lighting housing/can that is physically touching at least one fire-retarding material, as opposed to associating the fire-retarding material with a trim/reflector.

It is another objective of the present invention provide a lighting housing/can that is physically touching at least one fire-retarding material, such that the portions of the lighting housing/can that tend to get warmest during normal operation also are the portions of the lighting housing/can with the (most) fire-retarding material.

It is yet another objective of the present invention to provide a lighting housing/can that is physically touching at least one fire-retarding material, that can yield a two (2) hour fire rating, a one (1) hour fire rating, or some other predetermined fire rating.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE

Figure 1A:
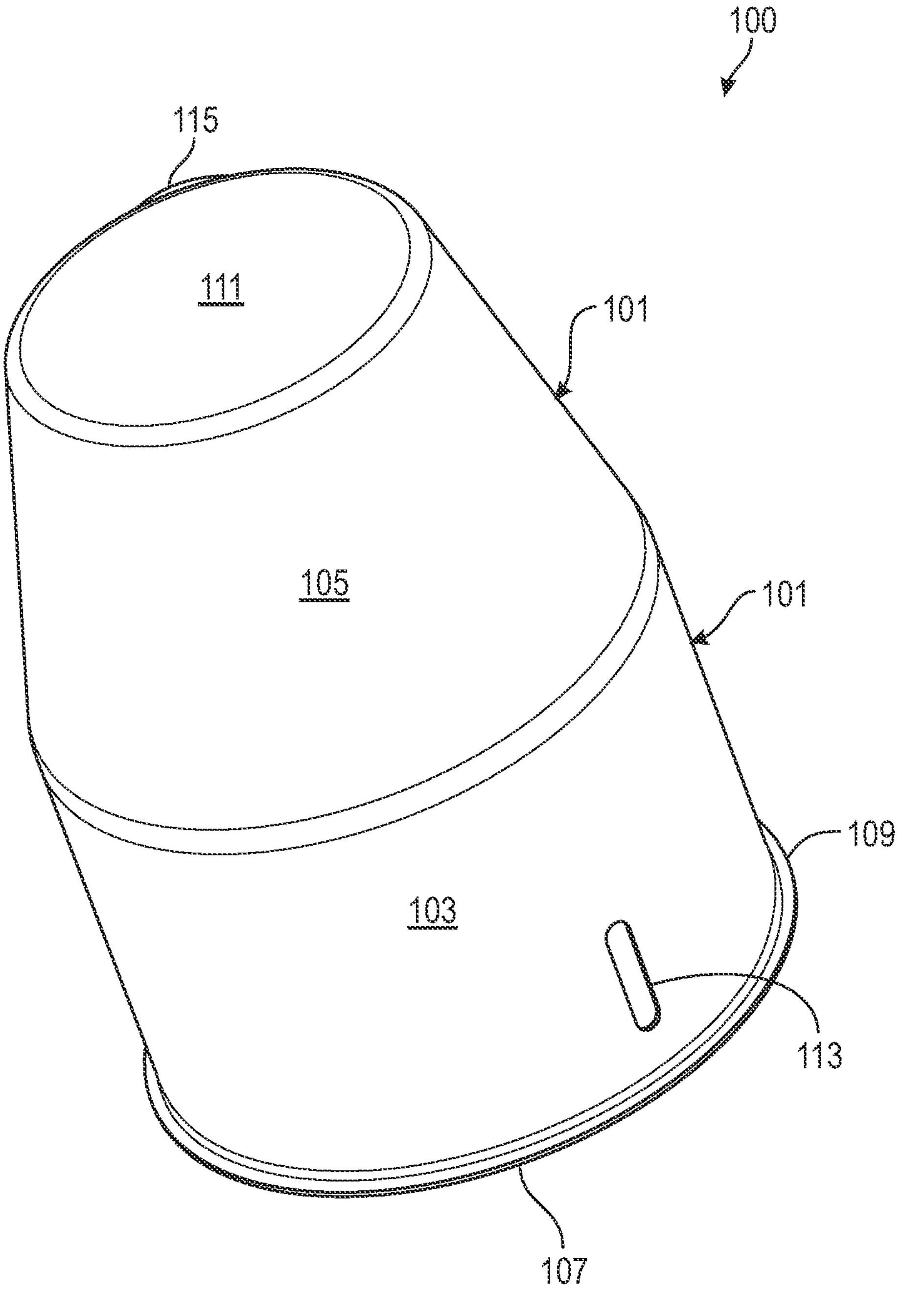
FIG. 1A shows top-down perspective view of fire rated lighting housing/can ("housing/can") according to at least one embodiment of the present invention.

100 housing-with-fire-retarding-material 100 (housing/can 100)
101 sidewall 101
103 cylindrical-sidewall 103
105 conical-sidewall 105
107 bottom 107
109 flare 109
111 top 111
113 slot 113
114 hole 114
115 attachment-anchor 115
117 top-interior 117
119 sidewall-interior 119
121 attachment-anchor 121
201 fire-retarding-material 201

203 fire-retarding-material 203
205 fire-retarding-material 205
207 fire-retarding-material 207
209 upper-fire-retarding-material 209
211 lower-fire-retarding-material 207
213 band-of-no-fire-retarding-material 213
301 uniform-thickness-fire-retarding-material 301
303 upper-thicker-fire-retarding-material 303
305 lower-thicker-fire-retarding-material 305
307 middle-thicker-fire-retarding-material 307
401 fire-retarding-material 401
403 fire-retarding-material 403
405 fire-retarding-material 405
407 fire-retarding-material 407
501 housing/can 501
503 exterior-shell 503
505 interior-shell 505
600 overall-lighting-assembly 600
601 frame 601
603 junction-box 603
605 hanger-bar-subassembly 605
607 flex-conduit 607
609 gasket 609

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Note, unless otherwise noted, below discussions of FIG. 1A to FIG. 6B are with respect to a cool-state (non-fire state) of housing-with-fire-retarding-material 100 (hereinafter, "housing/can 100"). Whereas, in a hot-state (fire state), fire-retarding-material(s) of housing/can 100 may expand and/or move as compared to what is shown in FIG. 1A to FIG. 6B, with respect to fire-retarding-material(s) of housing/can 100.

Figure 1B:
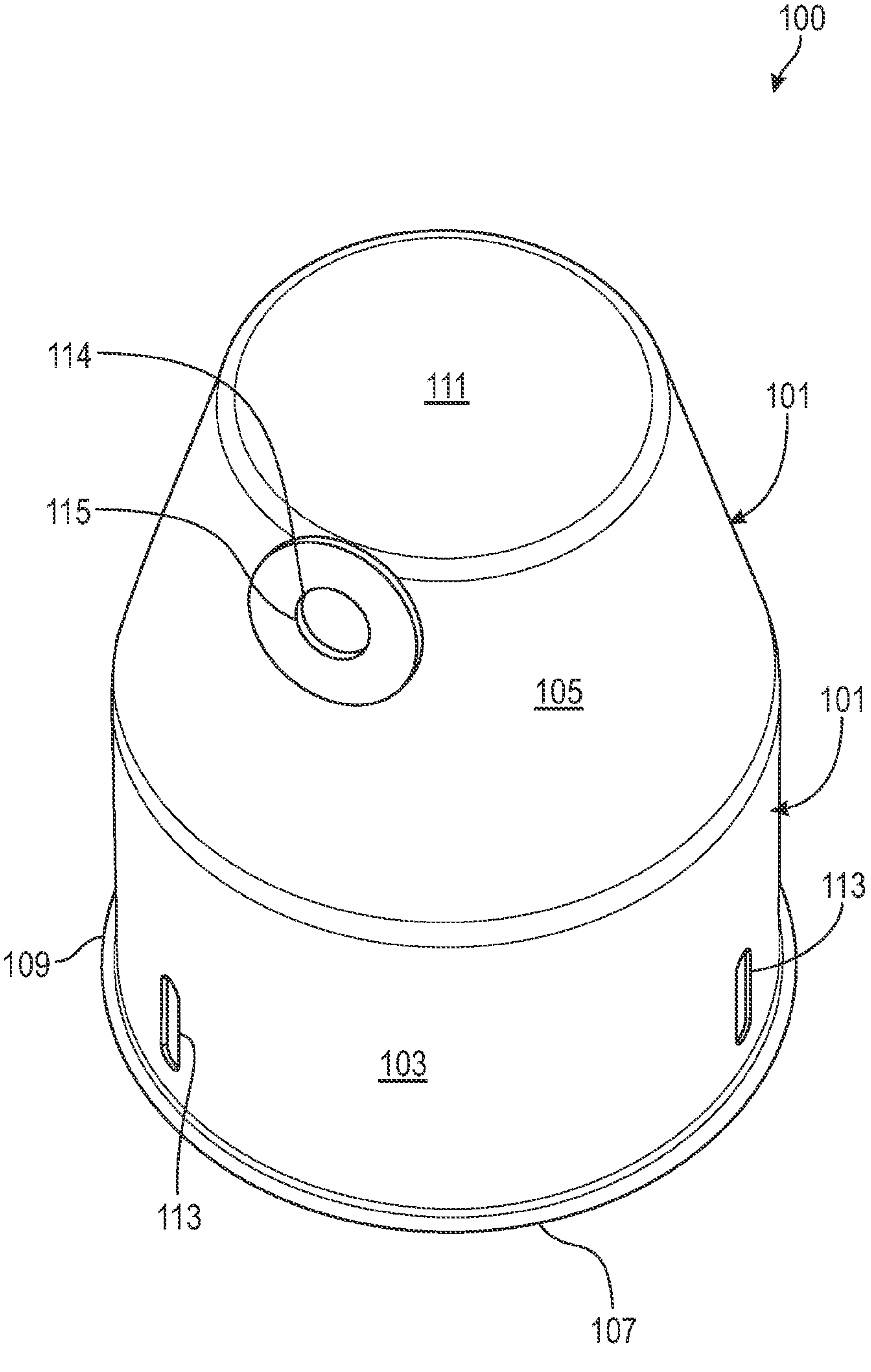
FIG. 1B shows another top-down perspective view of the housing/can of FIG. 1A, but from a different viewing angle as compared to FIG. 1A.
Figure 1C:
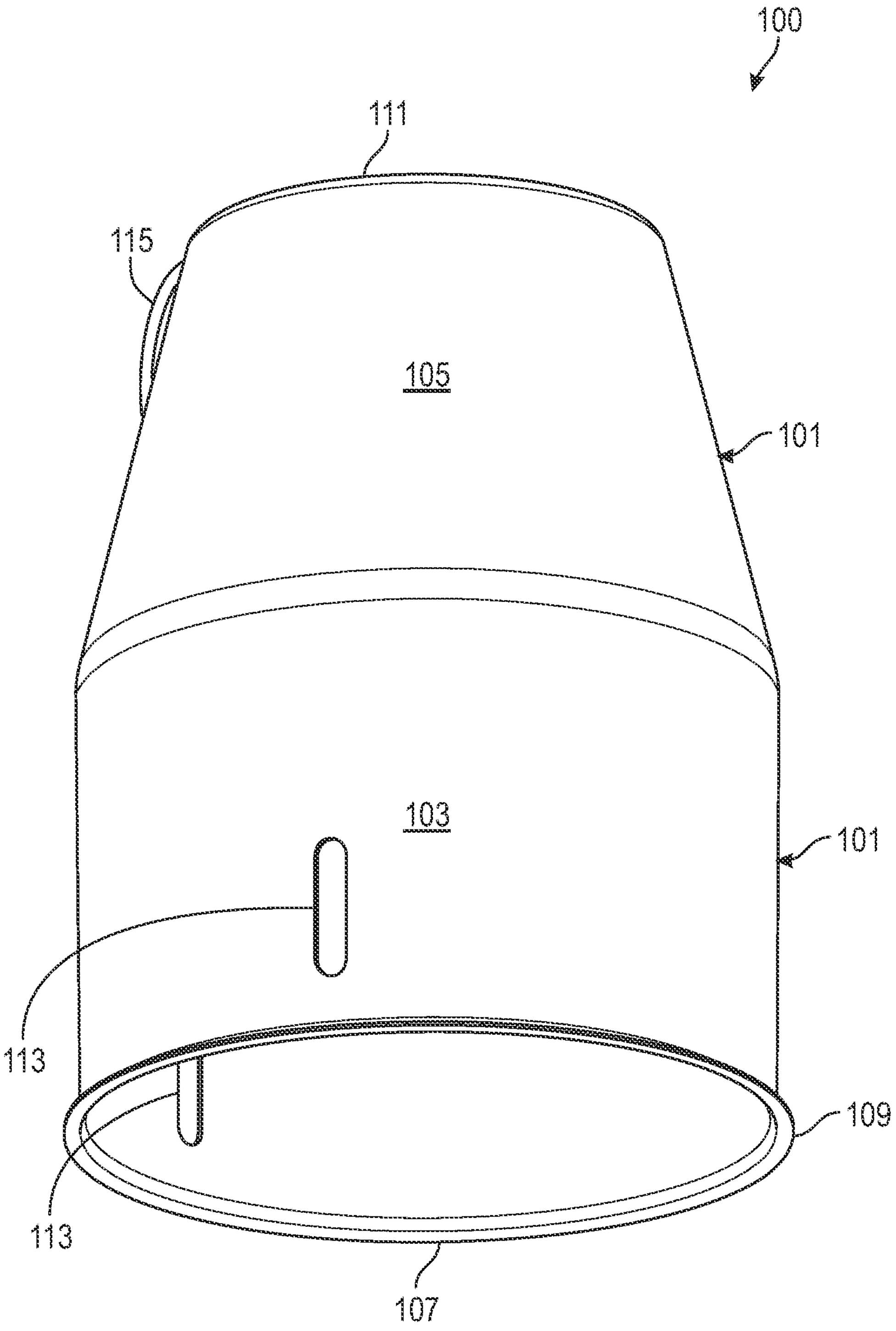
FIG. 1C shows bottom-up perspective view of the housing/can of FIG. 1A, showing at least some interior portion of the housing/can.
Figure 1D:
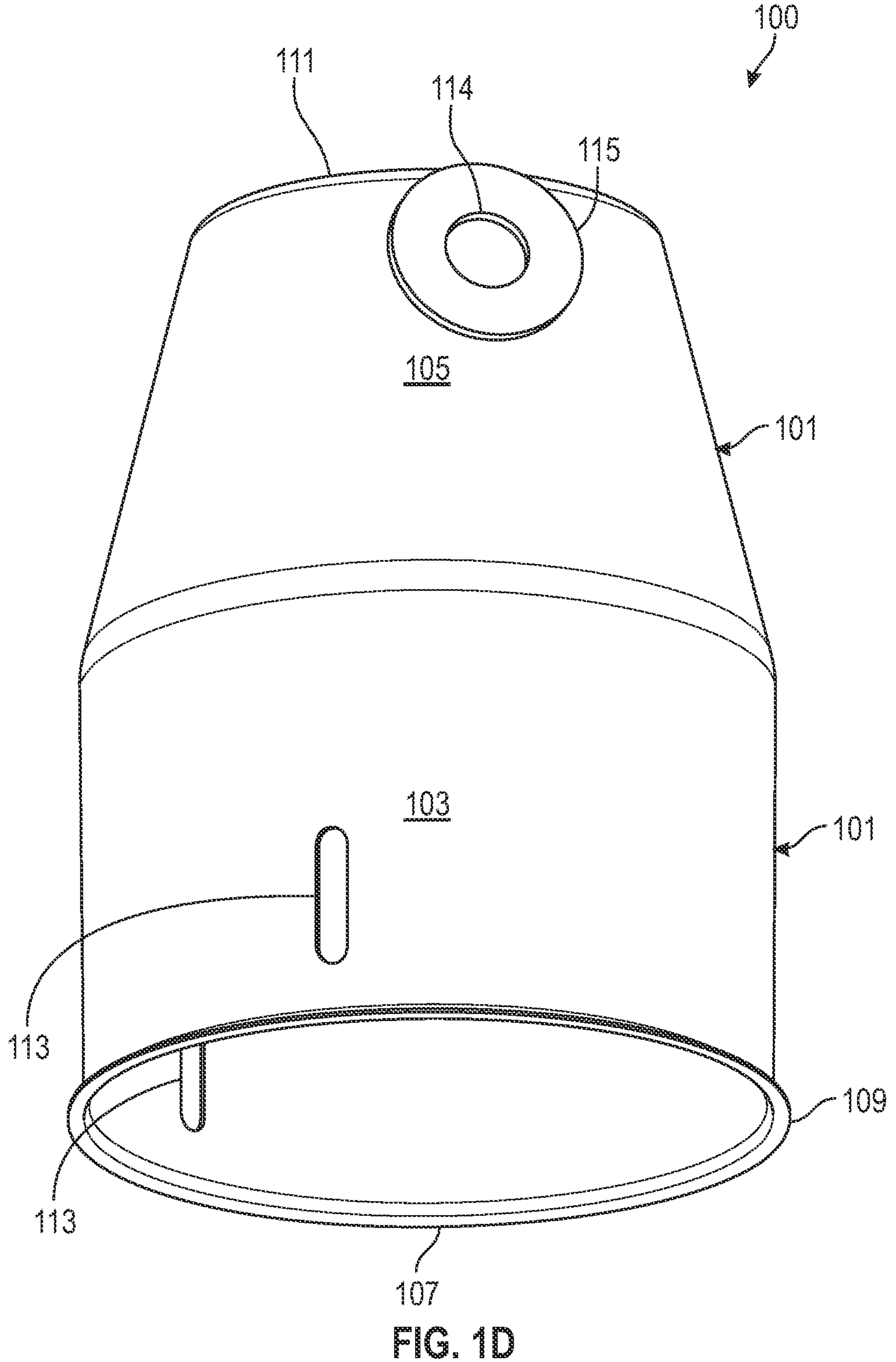
FIG. 1D shows another bottom-up perspective view of the housing/can of FIG. 1A, but from a different viewing angle as compared to FIG. 1C.
Figure 1E:
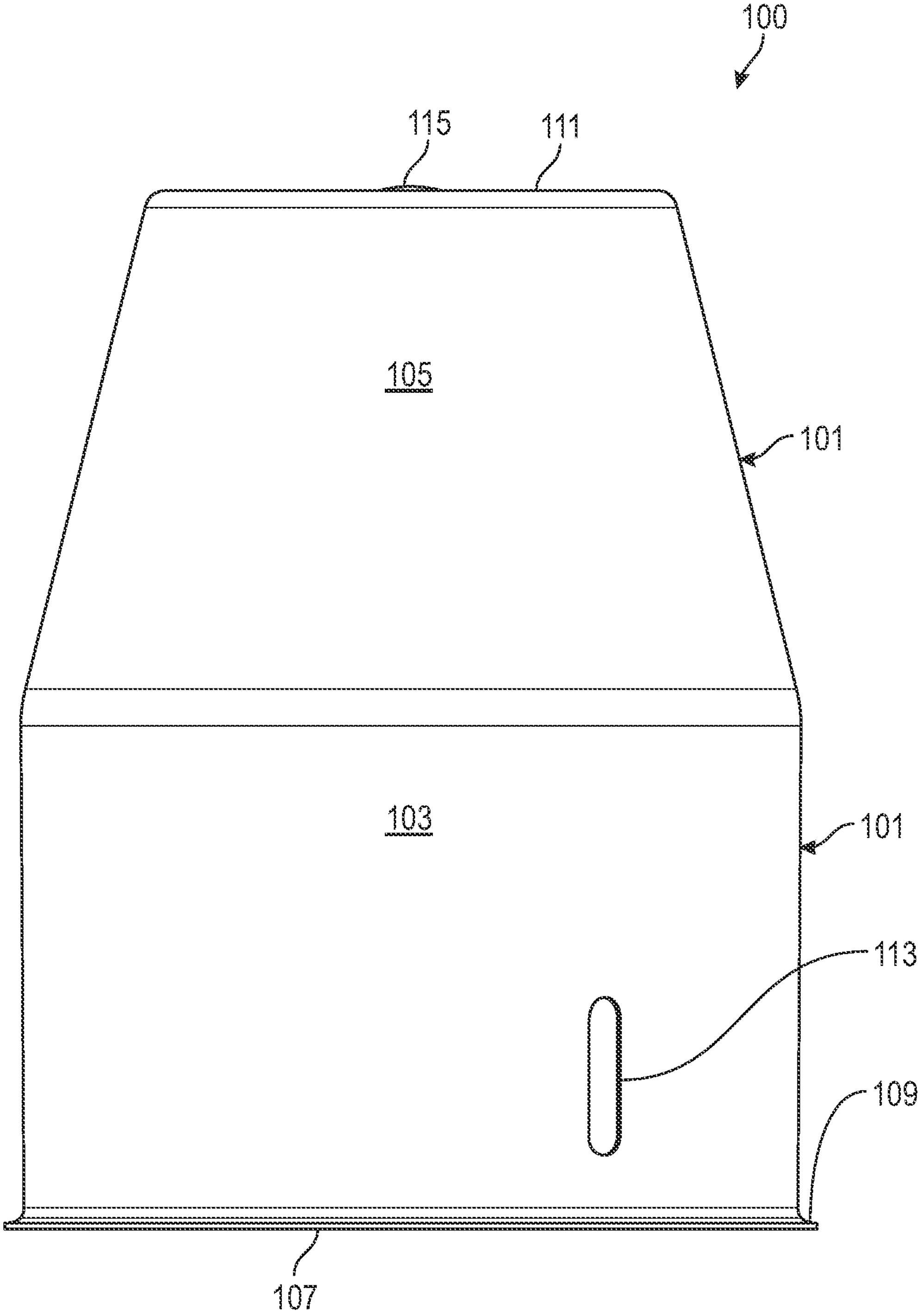
FIG. 1E shows a front view of the housing/can of FIG. 1A.
Figure 1F:
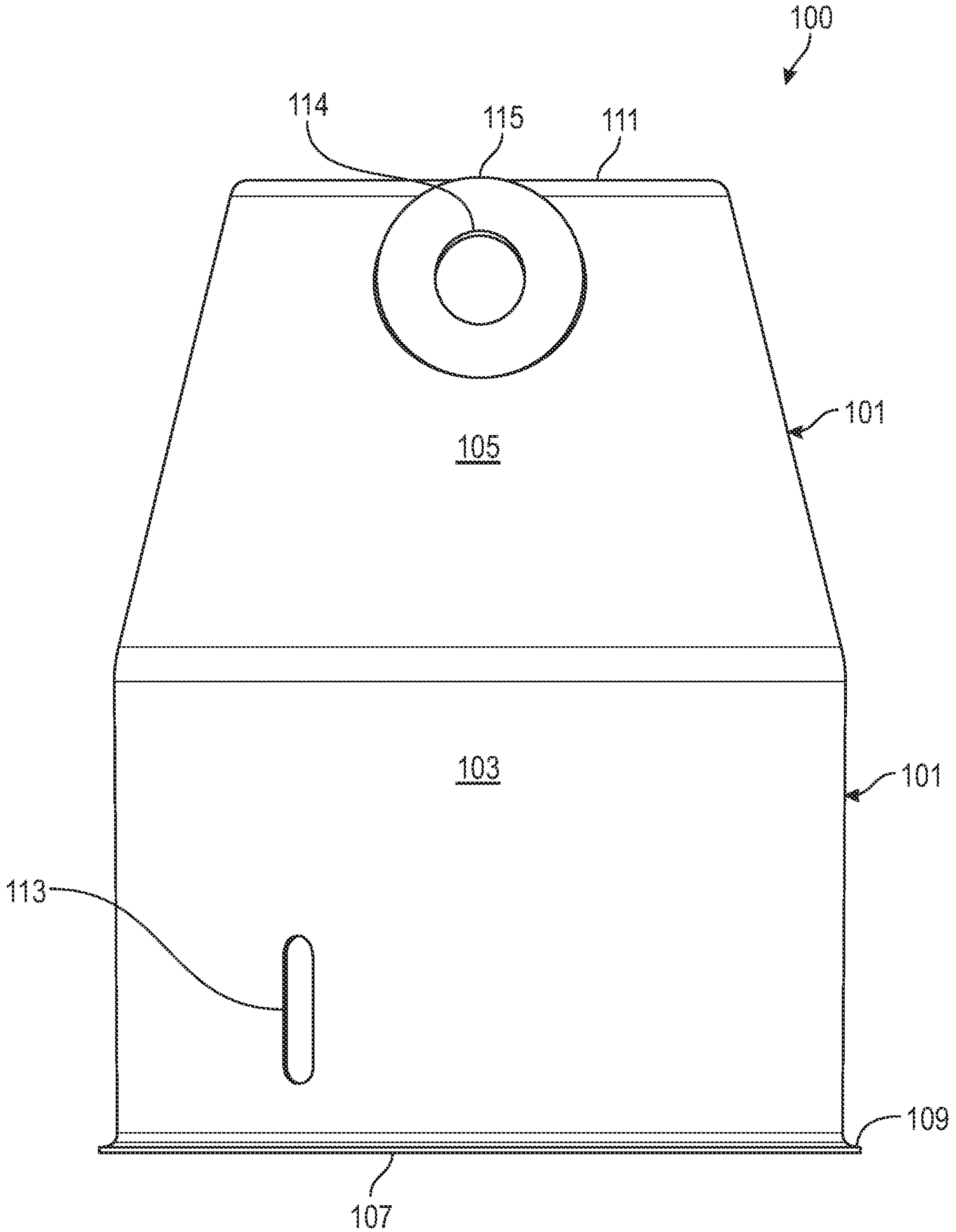
FIG. 1F shows a rear (back) view of the housing/can of FIG. 1A.
Figure 1G:
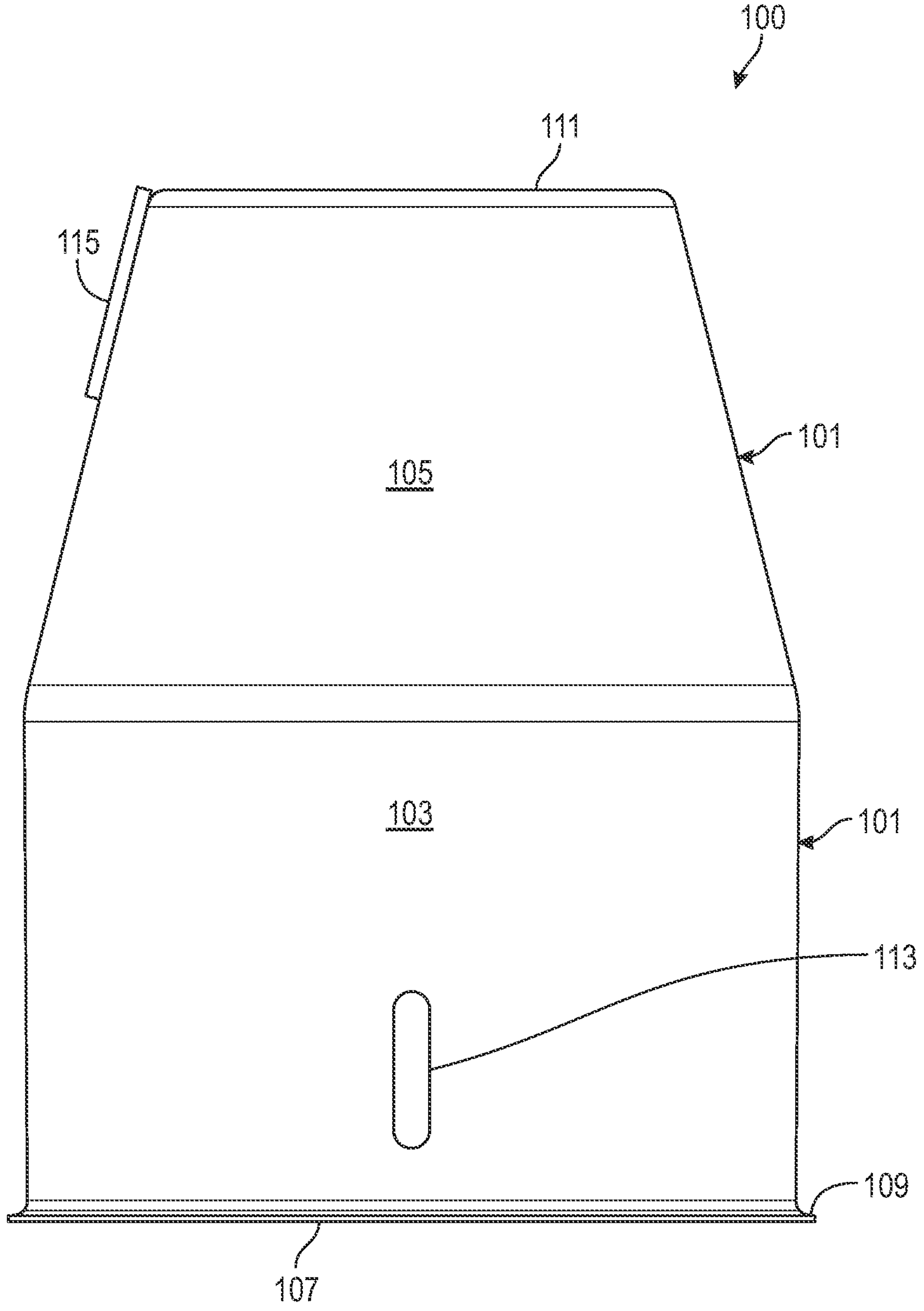
FIG. 1G shows a left-side view of the housing/can of FIG. 1A.
Figure 1H:
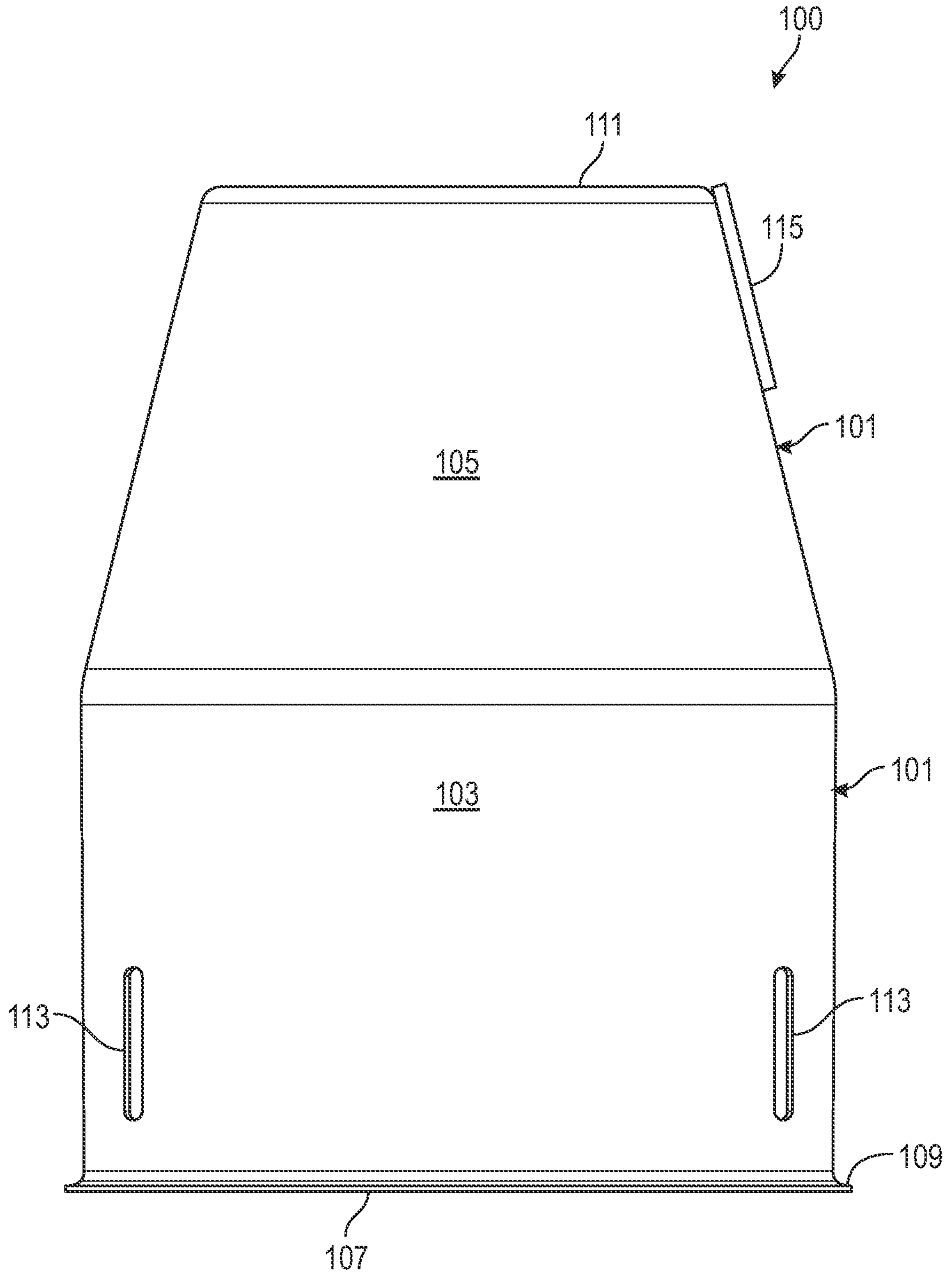
FIG. 1H shows a right-side view of the housing/can of FIG. 1A.
Figure 1I:
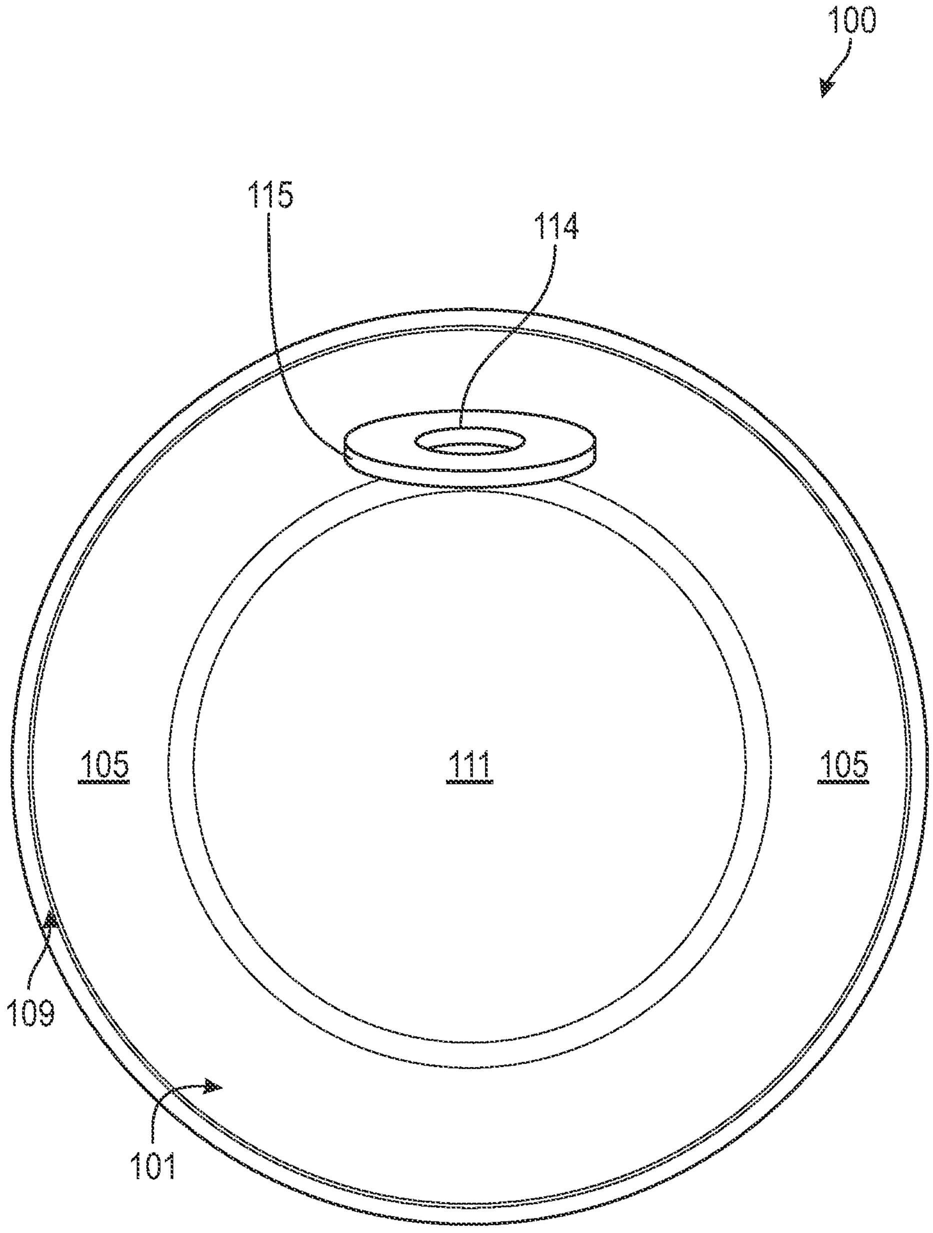
FIG. 1I shows a top-down view of the housing/can of FIG. 1A.
Figure 1J:
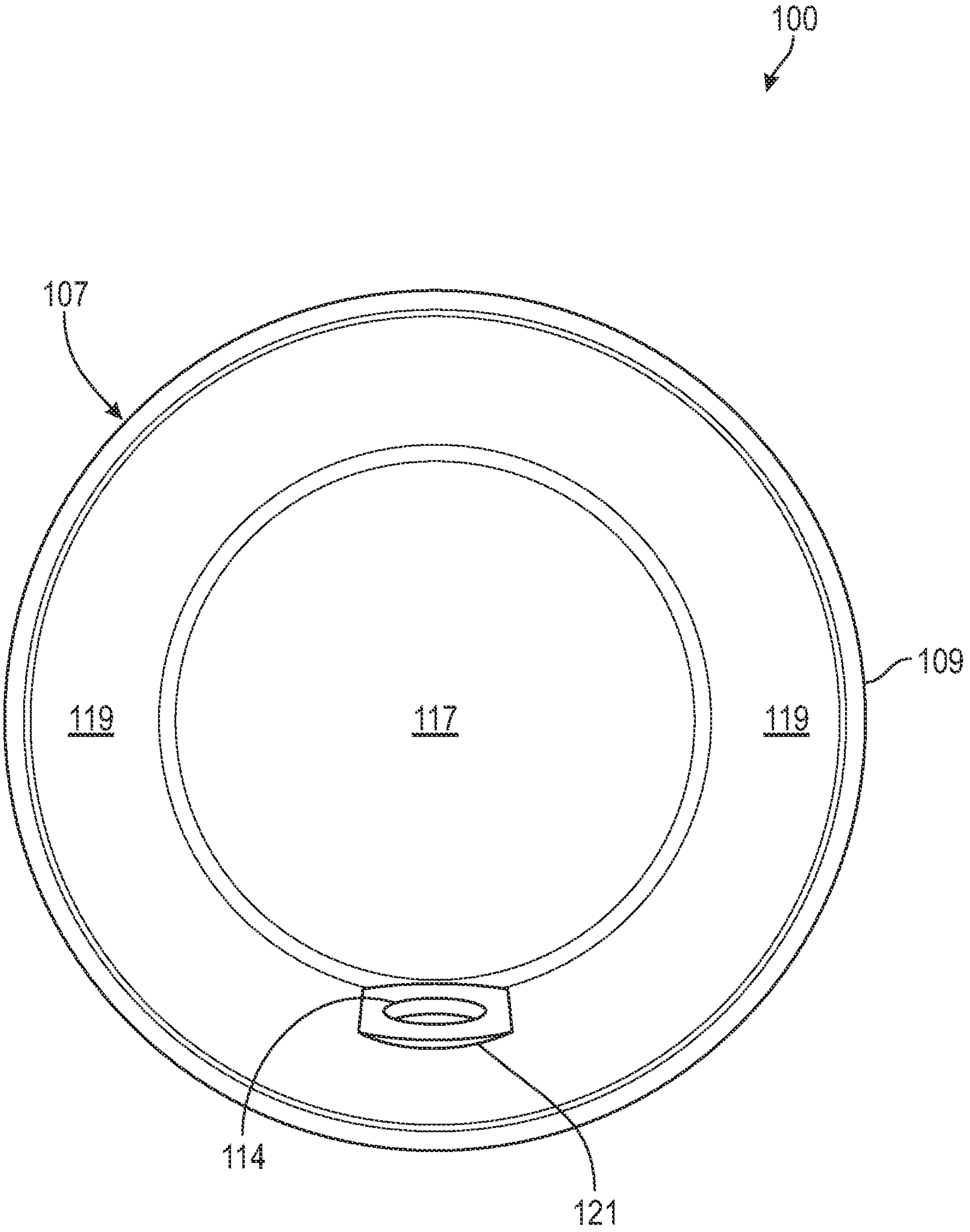
FIG. 1J shows a bottom-up view of the housing/can of FIG. 1A.

FIG. 1A to FIG. 1J show various views of a housing-with-fire-retarding-material 100 (hereinafter referred to as "housing/can 100"). FIG. 1A shows top-down perspective view of housing/can 100. FIG. 1B shows another top-down perspective view of housing/can 100, from a different viewing angle as compared to FIG. 1A. FIG. 1C shows bottom-up perspective view of housing/can 100, showing at least some interior portion of housing/can 100. FIG. 1D shows another bottom-up perspective view of housing/can 100, from a different viewing angle as compared to FIG. 1C. FIG. 1E shows a front view of housing/can 100. FIG. 1F shows a rear (back) view of housing/can 100. FIG. 1E and FIG. 1F may be opposing views with respect to each other. FIG. 1G shows a left-side view of housing/can 100. FIG. 1H shows a right-side view of housing/can 100. FIG. 1G and FIG. 1H may be opposing views with respect to each other. FIG. 1I shows a top-down view of housing/can 100. FIG. 1J shows a bottom-up view of housing/can 100. FIG. 1I and FIG. 1J may be opposing views with respect to each other.

In some embodiments, housing/can 100 may be used as a component to an overall-lighting-assembly 600, that would typically be installed above a ceiling and attached to ceiling joists (e.g., as a component to form a recessed light in a ceiling). See e.g., FIG. 6A and/or FIG. 6B. In some embodiments, at least one main function of housing/can 100, in overall-lighting-assembly 600, is for housing/can 100 to house/retain at least one light emitting element (such as, but not limited to, at least one light-emitting diode [LED]); wherein light emitted by the at least one light emitting element may be directed out of an open bottom of housing/can 100. In some embodiments, the at least one light emitting element may be in the form of a chip, a printed circuit board (PCB), and/or an integrated circuit. In some embodiments, during normal operation at least some portion of the at least one light emitting element may be warm and/or hot. In some embodiments, the at least one light emitting element may be other than a LED. In some embodiments, the at least one light emitting element may be one or more of: a LED, an incandescent light source, a fluorescent light source, a CFL (compact fluorescent light) source, a halogen light source, a neon light source, a sodium light source, a predetermined light source, at least a portion of an electronic circuit that emits light, portions thereof, combinations thereof, and/or the like.

In some embodiments, another function of housing/can 100, in overall-lighting-assembly 600, is for housing/can 100 to house/retain a generally frustrum shaped reflector that is positioned below the at least one light emitting element and within housing/can 100 to further direct light emitted by the at least one light emitting element out of the open bottom of housing/can 100. The generally frustrum shaped reflector is open at the reflector's top and bottom.

In some embodiments, a bottom of that generally frustrum shaped reflector may be attached to finish trim; or the finish trim may be attached to a bottom of housing/can 100; or the finish trim may be integral with the generally frustrum shaped reflector. The finish trim generally includes a flat/disc annular flange portion that physically touches a bottom surface of the ceiling that has the overall-lighting-assembly 600 installed above that ceiling. The flat/disc annular flange portion of the finish trim is generally visible (even when painted) once the full ceiling install is complete.

In some embodiments, housing/can 100 may also house a driver, generally located above the at least one light emitting element and within housing/can 100 to provide the appropriate electrical power to power the at least one light emitting element. In some embodiments, during normal operation the driver may be warm and/or hot, but not dangerously so.

In some embodiments, housing/can 100 may also house a heat sink, generally located above the at least one light emitting element and within housing/can 100 to help dissipate heat away from the driver and/or to help dissipate heat away from the at least one light emitting element. In some embodiments, the heat sink may be physical communication with the driver and/or with the at least one light emitting element. In some embodiments, during normal operation the heat sink may be warm and/or hot, but not dangerously so.

At least some building codes and/or the like may require fire mitigating means deployed between different but adjacent floors (e.g., a first floor and a second floor; a lower floor and an immediately located above floor, etc.) to at least slow the spread of fire from a lower floor to a next adjacent above floor. For example, such building codes require that it should take a fire breaking out on a lower floor to take at least two hours to reach the immediately above located floor, wherein this is the "two (2) hour rating." Often this two (2) hour rating may be accomplished by layering two layers of at least ⅝ (five-eights) inch (or thicker) drywall between those two adjacent floors (i.e., the ceiling of the lower floor may be comprised of two layers of at least ⅝ inch [or thicker]

drywall). However, when ceiling lights (recessed lights) are installed in the ceiling, the ceiling lights necessarily create holes in that ceiling drywall, which without some additional mechanism would defeat the two (2) hour rating by creating pathways for fire migration. To alleviate that concern, ceiling light fixtures, where a two (2) hour rating is required, may also need to have at least that same two (2) hour rating. In some embodiments, housing/can 100 may comprise at least one fire-retarding-material(s). In some embodiments, the specifics of that association between the at least one fire-retarding-material(s) of housing/can 100 may be shown in figures FIG. 2A to FIG. 5.; whereas, FIG. 1A to FIG. 1J focuses more on the structures and/or geometry of housing/can 100; and FIG. 6A to FIG. 6B focuses more on the structures and/or geometry of lighting-assembly 600.

In some embodiments, the fire-retarding-material(s) of this present invention may be selected from one or more of: intumescent material(s), glass, silica fiberglass, silica fiberglass fabric, mica, portions thereof, combinations thereof, and/or the like. In some embodiments, the at least one fire-retarding material may be at least one layer of silica fiberglass fabric or the like.

In some embodiments, the fire-retarding-material(s) of this present invention may be deployed/applied onto at least some surface(s) of housing/can 100 in the form of one or more of: a shell, a cover, a fabric, a tape, a wrap, a paint, by brushing, a gel, a spray, as a paper mâché (papier mâché) or the like, a cast, a foam, a paste, a putty, a clay, a mud, portions thereof, combinations thereof, and/or the like.

In some embodiments, the fire-retarding-material(s) of this present invention may be in one or more of the following forms: a glass, a fabric, a tape, a wrap, a foam, a ceramic, a sheet, a layer, a skin, a shell, a cup, a cover, a collar, a band, a paint, a layer from dipping, a gel, a paste, a putty, a clay, a mud, portions thereof, combinations thereof, and/or the like.

In some embodiments, the predetermined fire rating for housing/can 100 may be at least two (2) hours, at least one (1) hour, or some other predetermined fire rating. In some embodiments, the fire-retarding-material(s) of this present invention may provide (yield) housing/can 100 that is capable of meeting a predetermined fire-rating. In some embodiments, the fire-retarding-material(s) of this present invention may provide (yield) housing/can 100 that is capable of meeting/achieving a predetermined fire-rating of two (2) hours or more. In some embodiments, the fire-retarding-material(s) of this present invention may provide (yield) housing/can 100 that is capable of meeting/achieving a predetermined fire-rating of at least two (2) hours, at least one (1) hour, or some other predetermined fire rating.

In some embodiments, a cool-state (non-fire state) may be when a temperature of the housing is at or below a predetermined normal operating temperature for the housing. In some embodiments, the fire-retarding material may be configured to slow an elevation (rise) of the temperature of the housing/can above the predetermined normal operating temperature to achieve a predetermined fire rating for the housing/can.

In some embodiments, the cool-state (non-fire state) may be mutually exclusive to a hot-state (fire state). In some embodiments, the hot-state (fire state) may be when a temperature of the housing exceeds the predetermined normal operating temperature for the housing to a point where fire and/or melting may begin to occur with elements within and/or proximate to housing/can 100.

Distinction between the cool-state (non-fire state) and the hot-state (fire state) may be important, because if the temperature of the housing reaches or exceeds predetermined normal operating temperature for the housing to reach the hot-state (fire state), at least some of the fire-retarding-material(s) of this present invention (e.g., intumescent material(s)) may expand in volume, such that what these fire-retarding-material(s) physically touches in the hot-state (fire state) may be very different as compared to what these fire-retarding-material(s) physically touches in the cool-state (non-fire state).

In some embodiments, housing/can 100 may not be the finish trim (also referred to as "trim part/component," as the "trim part/component" is commonly understood in the light fixture industry). However, in some embodiments, a trim part/component may be used with housing/can 100 (e.g., with the trim part/component being at least partially located below housing/can 100). As noted above, the trim part/component usually has the flat/disc annular flange portion and housing/can 100 does not include a flat/disc annular flange portion.

In some embodiments, housing/can 100 may not be a "reflector part/component," as a "reflector" part/component is commonly understood in the light fixture industry. However, in some embodiments, a reflector part/component may be used with housing/can 100 (e.g., with the reflector part/component being at least partially located within a bottom of housing/can 100). As noted above, the reflector usually has at least a main portion that is a frustrum shape, that is open at the reflector's top and bottom. Whereas, housing/can 100 only a top/upper portion of housing/can 100 may have a frustrum shape, with the bottom/lower portion of housing/can 100 being right-cylindrical in shape; and with housing/can 100 being closed at a top of housing/can 100.

In some embodiments, housing/can 100 may comprise a sidewall 101. In some embodiments, the sidewall 101 may be rigid. In some embodiments, sidewall 101 may be a solid and a rigid portion of housing/can 100. In some embodiments, sidewall 101 may be at least substantially (mostly) closed portions of housing/can 100, except for any slot(s) 113 and/or hole(s) 114 within sidewall 101. In some embodiments, sidewall 101 may at least substantially (mostly) entirely enclose/surround an internal-volume of housing/can 100, except for the open bottom 107 of housing/can 100, and for any slot(s) 113 and/or hole(s) 114 in sidewall 101. In some embodiments, the internal-volume of housing/can 100 may be for housing the at least one light emitting element and one or more of: the driver, the heat sink, the reflector, and/or at least a portion of the finish trim. Bottom portions of the internal-volume of housing/can 100 may be shown in FIG. 1C and/or in FIG. 1D; and see FIG. 1J for the entirety of the internal-volume of housing/can 100.

In some embodiments, sidewall 101 may have a (right) cylindrical-sidewall 103 aspect and a conical-sidewall 105 aspect. In some embodiments, cylindrical-sidewall 103 may be sidewall of housing/can 100 that is at least substantially (mostly) right-cylindrical in shape. See e.g., FIG. 1A to FIG. 1H. In some embodiments, conical-sidewall 105 may be sidewall of housing/can 100 that is at least substantially (mostly) conical in shape (e.g., as in a frustrum shape that is closed at the top). In some embodiments, cylindrical-sidewall 103 may transition at least substantially (mostly) seamlessly into conical-sidewall 105, near a middle of housing/can 100, with respect to an overall height/length of housing/can 100. See e.g., FIG. 1E to FIG. 1H. In some embodiments, sidewall 101 may run from a bottom 107 of housing/can 100 to a top 111 of housing/can 100. In some embodiments, bottom 107 may be the bottom of housing/can 100. In some embodiments, top 111 may be the top of housing/can 100. See e.g., FIG. 1A to FIG. 1H. In some embodiments, housing/can 100 may be entirely open (to at least mostly open) at bottom 107. See e.g., FIG. 1C, FIG. 1D, and FIG. 1J. In some embodiments, housing/can 100 may be entirely closed (to at least mostly closed) at top 111. In some embodiments, top 111 may be flat, solid, and closed portion of housing/can 100. See e.g., FIG. 1A, FIG. 1B, and FIG. H. In some embodiments, cylindrical-sidewall 103 may be closer to bottom 107 than to top 111. In some embodiments, conical-sidewall 105 may be closer to top 111 than to bottom 107. In some embodiments, a diameter (outside or inside) of cylindrical-sidewall 103 may be substantially (mostly) fixed for most of the height/length of cylindrical-sidewall 103. In some embodiments, a diameter (outside or inside) of conical-sidewall 105 may decrease with respect to a direction from bottom 107 to top 111. See e.g., FIG. 1E to FIG. 1H.

FIG. 1J may show top-interior 117. In some embodiments, top-interior 117 may be a top interior surface of housing/can 100. In some embodiments, top-interior 117 may be an opposing surface to top 111, wherein top-interior 117 may be separated from top 111 by a thickness of top 111. In some embodiments, top-interior 117 may be a flat, a solid, and a closed portion of housing/can 100. In some embodiments, top-interior 117 may form the top boundary to the internal-volume of housing/can 100. See FIG. 1J.

FIG. 1J may show sidewall-interior 119. In some embodiments, sidewall-interior 119 may be an interior surface sidewall of housing/can 100. In some embodiments, sidewall-interior 119 may be an opposing surface to sidewall 101, wherein sidewall-interior 119 may be separated from sidewall 101 by a thickness of sidewall 101. In some embodiments, sidewall-interior 119 may be a solid and a rigid portion of housing/can 100. In some embodiments, sidewall-interior 119 may be at least substantially (mostly) closed portions of housing/can 100, except for any slot(s) 113 and/or hole(s) 114 within sidewall-interior 119. In some embodiments, sidewall-interior 119 may form the internal side boundaries to the internal-volume of housing/can 100. See also FIG. 1C and FIG. 1D that show bottom portions of sidewall-interior 119.

In some embodiments, housing/can 100 may comprise: bottom 107, top 111, sidewall 101, and at least one at least one fire-retarding material. In some embodiments, bottom 107 may be at least substantially to entirely open. In some embodiments, top 111 may be at least substantially (mostly) closed or entirely closed. In some embodiments, sidewall 101 may run from bottom 107 to top 111. In some embodiments, top 111 and sidewall 101 may at least substantially (mostly) enclose an internal-volume of housing/can 100. In some embodiments, the internal-volume of housing/can 100 may be configured to directly house at least one light emitting element. In some embodiments, the internal-volume of housing/can 100 may be configured to directly house lighting related electronics, such as, but not limited to, the at least one light emitting element, a driver, a heat sink, portions thereof, combinations thereof, and/or the like. In some embodiments, the internal-volume of housing/can 100 may be configured to directly house at least one driver. In some embodiments, the at least one driver may be operatively connected to the at least one light emitting element. In some embodiments, the at least one light emitting element may be at least one light emitting diode (LED). In some embodiments, the at least one fire-retarding material may be physically touching at least some portion of sidewall 101 when sidewall 101 is in a cool-state (non-fire state).

In some embodiments, housing/can 100 at bottom 107 may be without a substantially (mostly) flat annular flange structure, that if present would function as a trim component. In some embodiments, housing/can 100 may be configured to not be covered by an outermost enclosure; particularly if that outermost enclosure has an intumescent material touching a top inside portion of such an outermost enclosure in the cool-state (non-fire state). That is, in some embodiments, housing/can 100 is not associated with such an outermost enclosure.

In some embodiments, a bottom of cylindrical-sidewall 103 may comprise flare 109. In some embodiments, flare 109 may be an outward flare bottom portion of cylindrical-sidewall 103. In some embodiments, flare 109 may be of a uniform/same flare all around the bottom of cylindrical-sidewall 103. In some embodiments, flare 109 may not flare out so much as to form a flat annular flange, wherein such a flat annular flange may be characteristic of finish trim. See e.g., FIG. 1E to FIG. 1H.

In some embodiments, housing/can 100, sidewall 101, cylindrical-sidewall 103, and/or conical-sidewall 105 may comprise at least one slot 113 and/or at least one hole 114. In some embodiments, slot 113 may be a through hole or a slot within housing/can 100, sidewall 101, cylindrical-sidewall 103, and/or conical-sidewall 105. In some embodiments, hole 114 may be a through hole or a slot within housing/can 100, sidewall 101, cylindrical-sidewall 103, and/or conical-sidewall 105. In some embodiments, slot 113 and/or hole 114 may pass entirely through a thickness of sidewall 101, cylindrical-sidewall 103, and/or conical-sidewall 105. In some embodiments, slot(s) 113 may be located on a lower portion of housing/can 100; and hole(s) 114 may be located on an upper portion of housing/can 100. In some embodiments, slot(s) 113 and/or hole(s) 114 may be in physical contact with one or more fire retarding material(s) of the present invention in the cool-state (non-fire state).

In some embodiments, slot 113 may be configured to provide for mechanical attachments means of housing/can 100 (or internal components of housing/can 100) to structures of overall-lighting-assembly 600 (e.g., frame 601). In some embodiments, cylindrical-sidewall 103 may comprise at least two slots 113 that may be configured to provide for mechanical attachments means of housing/can 100 (or internal components of housing/can 100) to structures of overall-lighting-assembly 600 (e.g., frame 601). In some embodiments, an overall height (length) of slot 113 may run in a vertical direction, such that the overall height (length) of slot 113 is at least substantially (mostly) parallel with a vertical-center-axis (vertical-center-longitudinal line) of housing/can 100. See e.g., FIG. 1A to FIG. 1H, FIG. 6A, and FIG. 6B.

In some embodiments, hole 114 may be at least substantially (mostly) a circular opening. In some embodiments, hole 114 may be configured to facilitate wiring/cabling from an exterior of housing/can 100 to an interior of housing/can 100. In some embodiments, conical-sidewall 105 may comprise at least one hole 114 (e.g., at attachment-anchor 115) that may be configured to facilitate wiring/cabling from the exterior of housing/can 100 to pass into the interior of housing/can 100. See e.g., FIG. 1B, FIG. 1D, FIG. 1F, FIG. 1I, and FIG. 1J.

In some embodiments, sidewall 101, cylindrical-sidewall 103, and/or conical-sidewall 105 may comprise at least one attachment-anchor 115. In some embodiments, conical-sidewall 105 may comprise at least one attachment-anchor 115. In some embodiments, attachment-anchor 115 may be physical structure that provides a location and/or structure for conduit to attach to housing/can 100. In some embodiments, attachment-anchor 115 may be in the form of a washer, gasket, bulkhead, passthrough, grommet, rivet, portions thereof, combinations thereof, and/or the like. In some embodiments, a hole 114 may be located in attachment-anchor 115. See e.g., FIG. 1B and FIG. 6A.

In some embodiments, opposing attachment-anchor 115, on an inside of housing/can 100, may be attachment-anchor 121. In some embodiments, attachment-anchor 121 may be physical structure that provides a location and/or structure for conduit to attach to housing/can 100. In some embodiments, attachment-anchor 121 may be attached to attachment-anchor 115. In some embodiments, attachment-anchor 115 and attachment-anchor 121 may be complimentary structures to each other. In some embodiments, attachment-anchor 121 may be in the form of a washer, gasket, bulkhead, passthrough, grommet, rivet, portions thereof, combinations thereof, and/or the like. In some embodiments, a hole 114 may be located in attachment-anchor 121. See e.g., FIG. 1J.

Unless otherwise stated, housing/can 100 as shown in FIG. 1A to FIG. 1J and as discussed above are applicable to FIG. 2A to FIG. 6B.

Figure 2A:
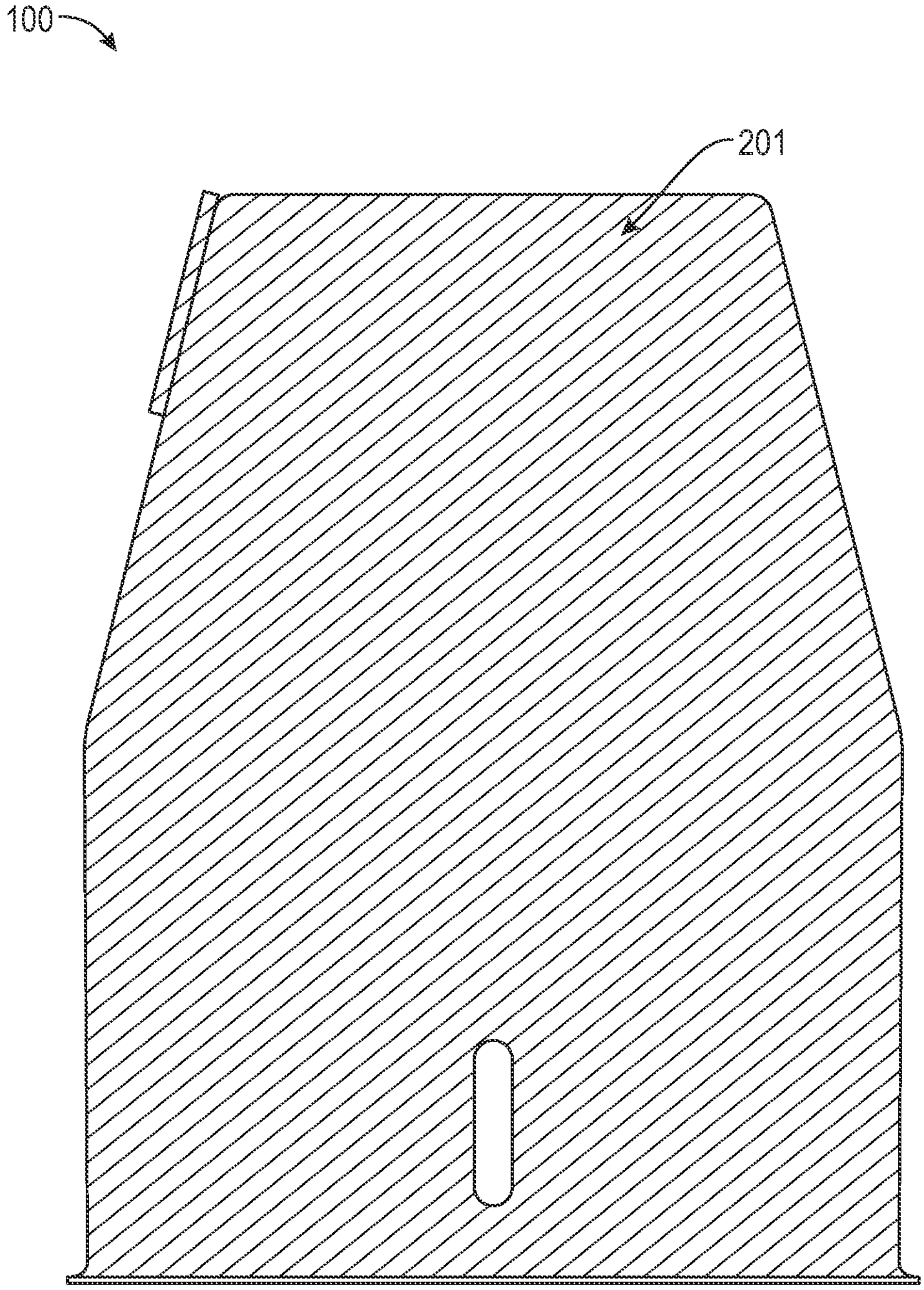
FIG. 2A shows a left-side view of the housing/can of FIG. 1A with an exterior fire-retarding-material deployed in a particular fashion on the housing/can.

FIG. 2A shows a left-side view of housing/can 100 with fire-retarding-material 201. In some embodiments, an exterior of housing/can 100 may be covered with fire-retarding-material 201. In some embodiments, an entire exterior of housing/can 100 may be covered with fire-retarding-material 201. In some embodiments, fire-retarding-material 201 may be deployed on top of the exterior of housing/can 100 in at least one layer. In some embodiments, fire-retarding-material 201 may be deployed on top of the exterior of housing/can 100 in one or more layer(s). In some embodiments, fire-retarding-material 201 may be a shell with a shape that is complimentary (matching) to an exterior shape of housing/can 100. In some embodiments, at least most of interior surfaces of fire-retarding-material 201 may be physically touching exterior surfaces of housing/can 100. In some embodiments, fire-retarding-material 201 of housing/can 100 may be of at least a substantially (mostly) uniform thickness.

Continuing discussing FIG. 2A, in some embodiments, an exterior of sidewall 101 (and/or of top 111) may be covered with fire-retarding-material 201. In some embodiments, an entire exterior of sidewall 101 (and/or of top 111) may be covered with fire-retarding-material 201. In some embodiments, fire-retarding-material 201 may be deployed on top of the exterior of sidewall 101 (and/or of top 111) in at least one layer. In some embodiments, fire-retarding-material 201 may be deployed on top of the exterior of sidewall 101 (and/or of top 111) in one or more layer(s). In some embodiments, fire-retarding-material 201 may be a shell with a shape that is complimentary (matching) to an exterior shape of sidewall 101 (and/or of top 111). In some embodiments, at least most of interior surfaces of fire-retarding-material 201 may be physically touching exterior surfaces of sidewall 101 (and/or of top 111). In some embodiments, fire-retarding-material 201 of sidewall 101 (and/or of top 111) may be of at least a substantially (mostly) uniform thickness.

Continuing discussing FIG. 2A, in some embodiments, the at least one fire-retarding material of housing/can 100 may be physically touching (and/or attached to) at least some portion of sidewall 101 when sidewall 101 is in the cool-state (non-fire state). In some embodiments, that at least some portion of sidewall 101 may be an entire exterior of sidewall 101. See e.g., FIG. 2A.

Figure 2B:
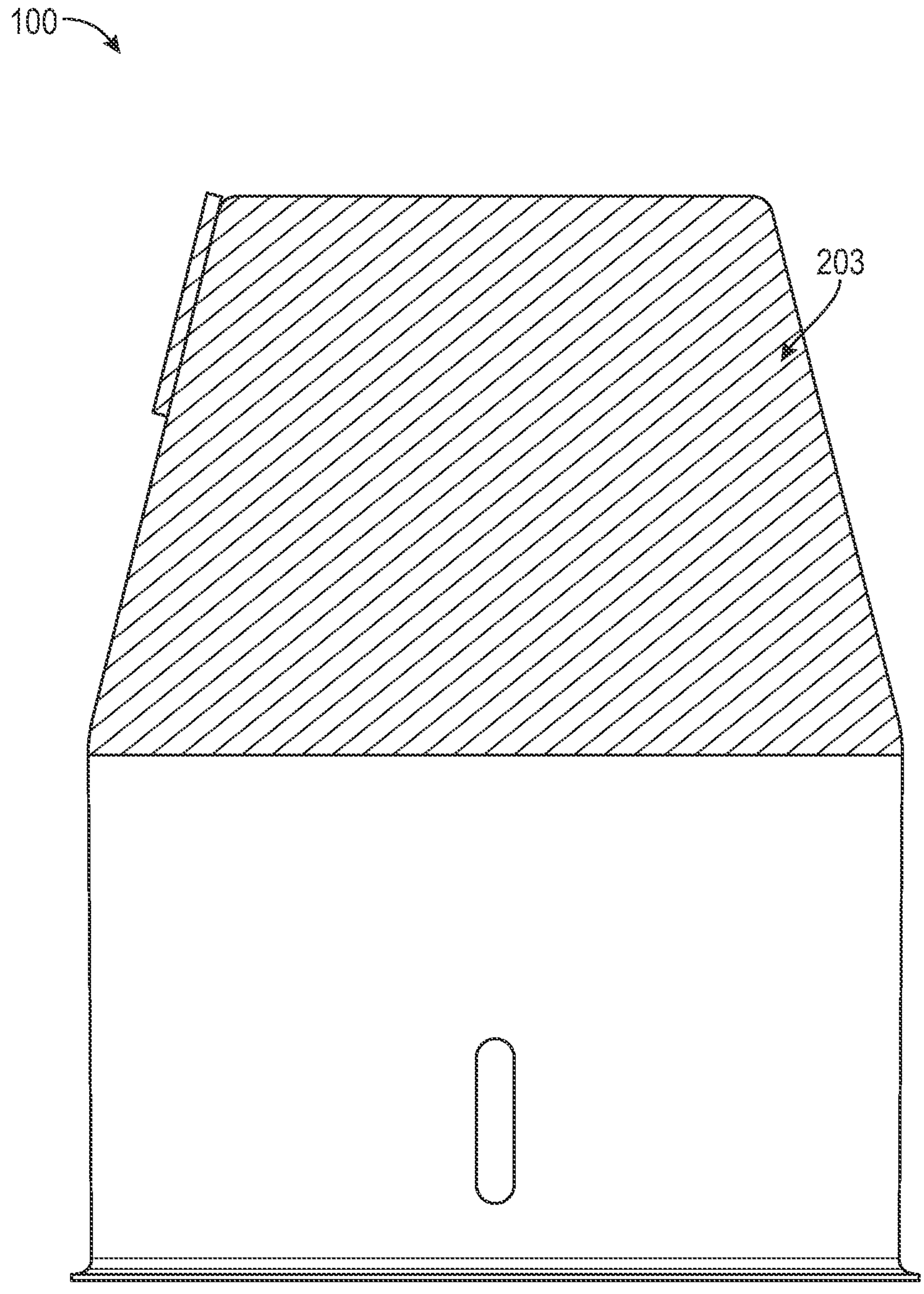
FIG. 2B shows a left-side view of the housing/can of FIG. 1A with an exterior fire-retarding-material deployed in a particular fashion on the housing/can.

FIG. 2B shows a left-side view of housing/can 100 with fire-retarding-material 203. In some embodiments, an upper (top portion) exterior of housing/can 100 may be covered with fire-retarding-material 203. In some embodiments, fire-retarding-material 203 may be deployed on top of the upper (top portion) exterior of housing/can 100 in at least one layer. In some embodiments, fire-retarding-material 203 may be deployed on top of the upper (top portion) exterior of housing/can 100 in one or more layer(s). In some embodiments, fire-retarding-material 203 may be a shell with a shape that is complimentary (matching) to an upper (top portion) exterior shape of housing/can 100. In some embodiments, at least most of interior surfaces of fire-retarding-material 203 may be physically touching the upper (top portion) exterior surfaces of housing/can 100. In some embodiments, fire-retarding-material 203 of housing/can 100 may be of at least a substantially (mostly) uniform thickness.

Continuing discussing FIG. 2B, in some embodiments, the upper (top portion) exterior of sidewall 101 (and/or of top 111) may be covered with fire-retarding-material 203. In some embodiments, fire-retarding-material 203 may be deployed on top of the upper (top portion) exterior of sidewall 101 (and/or of top 111) in at least one layer. In some embodiments, fire-retarding-material 203 may be deployed on top of the upper (top portion) exterior of sidewall 101 (and/or of top 111) in one or more layer(s). In some embodiments, fire-retarding-material 203 may be a shell with a shape that is complimentary (matching) to an upper (top portion) exterior shape of sidewall 101 (and/or of top 111). In some embodiments, at least most of interior surfaces of fire-retarding-material 203 may be physically touching the upper (top portion) exterior surfaces of sidewall 101 (and/or of top 111). In some embodiments, fire-retarding-material 203 of sidewall 101 (and/or of top 111) may be of at least a substantially (mostly) uniform thickness.

Continuing discussing FIG. 2B, in some embodiments, the exterior of conical-sidewall 105 (and/or of top 111) may be covered with fire-retarding-material 203. In some embodiments, fire-retarding-material 203 may be deployed on top of the exterior of conical-sidewall 105 (and/or of top 111) in at least one layer. In some embodiments, fire-retarding-material 203 may be deployed on top of the exterior of conical-sidewall 105 (and/or of top 111) in one or more layer(s). In some embodiments, fire-retarding-material 203 may be a shell with a shape that is complimentary (matching) to an exterior shape of conical-sidewall 105 (and/or of top 111). In some embodiments, at least most of interior surfaces of fire-retarding-material 203 may be physically touching the exterior surfaces of conical-sidewall 105 (and/or of top 111). In some embodiments, fire-retarding-material 203 of conical-sidewall 105 (and/or of top 111) may be of at least a substantially (mostly) uniform thickness.

Continuing discussing FIG. 2B, in some embodiments, fire-retarding-material 203 may not extend to one or more of: cylindrical-sidewall 103, the lower (bottom portion) exterior of sidewall 101, the lower (bottom portion) exterior of housing/can 100, portions thereof, combinations thereof, and/or the like. In some embodiments, fire-retarding-material 203 may not physically touch one or more of: cylindrical-sidewall 103, the lower (bottom portion) exterior of sidewall 101, the lower (bottom portion) exterior of housing/can 100, portions thereof, combinations thereof, and/or the like. In some embodiments, cylindrical-sidewall 103, the lower (bottom portion) exterior of sidewall 101, the lower (bottom portion) exterior of housing/can 100, portions thereof, combinations thereof, and/or the like may be devoid of fire-retarding-material. In some embodiments, at least some of: cylindrical-sidewall 103, the lower (bottom portion) exterior of sidewall 101, the lower (bottom portion) exterior of housing/can 100, portions thereof, combinations thereof, and/or the like, may be devoid of fire-retarding-material. In some embodiments, at least most of: cylindrical-sidewall 103, the lower (bottom portion) exterior of sidewall 101, the lower (bottom portion) exterior of housing/can 100, portions thereof, combinations thereof, and/or the like, may be devoid of fire-retarding-material.

Continuing discussing FIG. 2B, in some embodiments, the at least one fire-retarding material of housing/can 100 may be physically touching (and/or attached to) at least some portion of sidewall 101 when sidewall 101 is in the cool-state (non-fire state). In some embodiments, that at least some portion of sidewall 101 may be an upper exterior of sidewall 101. In some embodiments, sidewall 101 may comprise cylindrical-sidewall 103 and a conical-sidewall 105, where that at least some portion of sidewall 101 may be at least an exterior of conical-sidewall 105. See e.g., FIG. 2B.

Figure 2C:
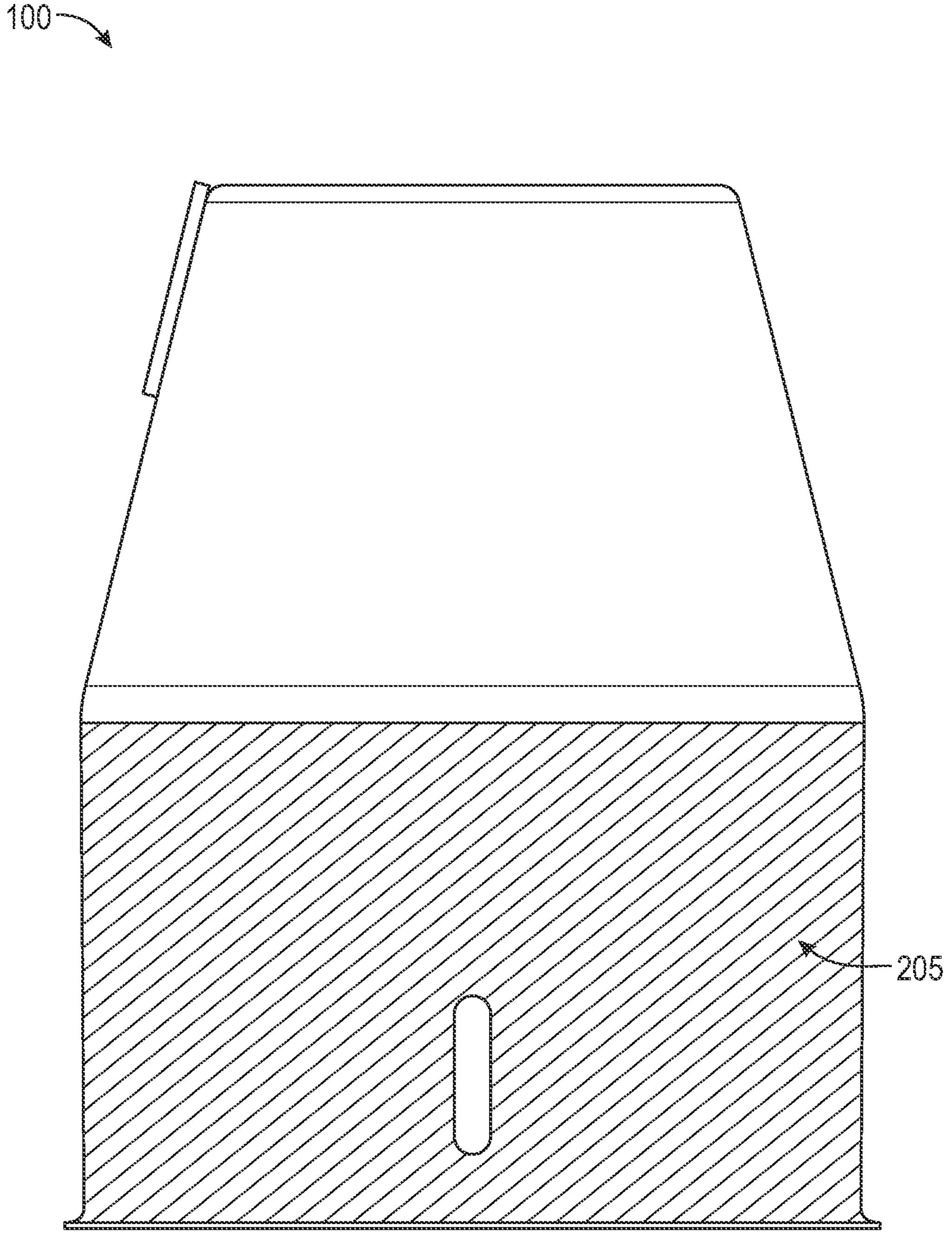
FIG. 2C shows a left-side view of the housing/can of FIG. 1A with an exterior fire-retarding-material deployed in a particular fashion on the housing/can.

FIG. 2C shows a left-side view of housing/can 100 with fire-retarding-material 205. In some embodiments, a lower (bottom portion) exterior of housing/can 100 may be covered with fire-retarding-material 205. In some embodiments, fire-retarding-material 205 may be deployed on top of the lower (bottom portion) exterior of housing/can 100 in at least one layer. In some embodiments, fire-retarding-material 205 may be deployed on top of the lower (bottom portion) exterior of housing/can 100 in one or more layer(s). In some embodiments, fire-retarding-material 205 may be a shell with a shape that is complimentary (matching) to a lower (bottom portion) exterior shape of housing/can 100. In some embodiments, at least most of interior surfaces of fire-retarding-material 205 may be physically touching the lower (bottom portion) exterior surfaces of housing/can 100. In some embodiments, fire-retarding-material 205 of housing/can 100 may be of at least a substantially (mostly) uniform thickness.

Continuing discussing FIG. 2C, in some embodiments, the lower (bottom portion) exterior of sidewall 101 may be covered with fire-retarding-material 205. In some embodiments, fire-retarding-material 205 may be deployed on top of the lower (bottom portion) exterior of sidewall 101 in at least one layer. In some embodiments, fire-retarding-material 205 may be deployed on top of the lower (bottom portion) exterior of sidewall 101 in one or more layer(s). In some embodiments, fire-retarding-material 205 may be a shell with a shape that is complimentary to a lower (bottom portion) exterior shape of sidewall 101. In some embodiments, at least most of interior surfaces of fire-retarding-material 205 may be physically touching the lower (bottom portion) exterior surfaces of sidewall 101. In some embodiments, fire-retarding-material 205 of sidewall 101 may be of at least a substantially (mostly) uniform thickness.

Continuing discussing FIG. 2C, in some embodiments, the exterior of cylindrical-sidewall 103 may be covered with fire-retarding-material 205. In some embodiments, fire-retarding-material 205 may be deployed on top of the exterior of cylindrical-sidewall 103 in at least one layer. In some embodiments, fire-retarding-material 205 may be deployed on top of the exterior of cylindrical-sidewall 103 in one or more layer(s). In some embodiments, fire-retarding-material 205 may be a shell with a shape that is complimentary to an exterior shape of cylindrical-sidewall 103. In some embodiments, at least most of interior surfaces of fire-retarding-material 205 may be physically touching the exterior surfaces of cylindrical-sidewall 103. In some embodiments, fire-retarding-material 205 of cylindrical-sidewall 103 may be of at least a substantially (mostly) uniform thickness.

Continuing discussing FIG. 2C, in some embodiments, fire-retarding-material 205 may not extend to one or more of: top 111, conical-sidewall 105, the upper (top portion) exterior of sidewall 101, the upper (top portion) exterior of housing/can 100, portions thereof, combinations thereof, and/or the like. In some embodiments, fire-retarding-material 205 may not physically touch one or more of: top 111, conical-sidewall 105, the upper (top portion) exterior of sidewall 101, the upper (top portion) exterior of housing/can 100, portions thereof, combinations thereof, and/or the like. In some embodiments, top 111, conical-sidewall 105, the upper (top portion) exterior of sidewall 101, the upper (top portion) exterior of housing/can 100, portions thereof, combinations thereof, and/or the like may be devoid of fire-retarding-material. In some embodiments, at least some of: top 111, conical-sidewall 105, the upper (top portion) exterior of sidewall 101, the upper (top portion) exterior of housing/can 100, portions thereof, combinations thereof, and/or the like, may be devoid of fire-retarding-material. In some embodiments, at least most of: top 111, conical-sidewall 105, the upper (top portion) exterior of sidewall 101, the upper (top portion) exterior of housing/can 100, portions thereof, combinations thereof, and/or the like, may be devoid of fire-retarding-material.

Continuing discussing FIG. 2C, in some embodiments, the at least one fire-retarding material of housing/can 100 may be physically touching (and/or attached to) at least some portion of sidewall 101 when sidewall 101 is in the cool-state (non-fire state). In some embodiments, that at least some portion of sidewall 101 may be a lower exterior of sidewall 101. In some embodiments, sidewall 101 may comprise cylindrical-sidewall 103 and a conical-sidewall 105, where that at least some portion of sidewall 101 may be at least an exterior of cylindrical-sidewall 103. See e.g., FIG. 2C.

Figure 2D:
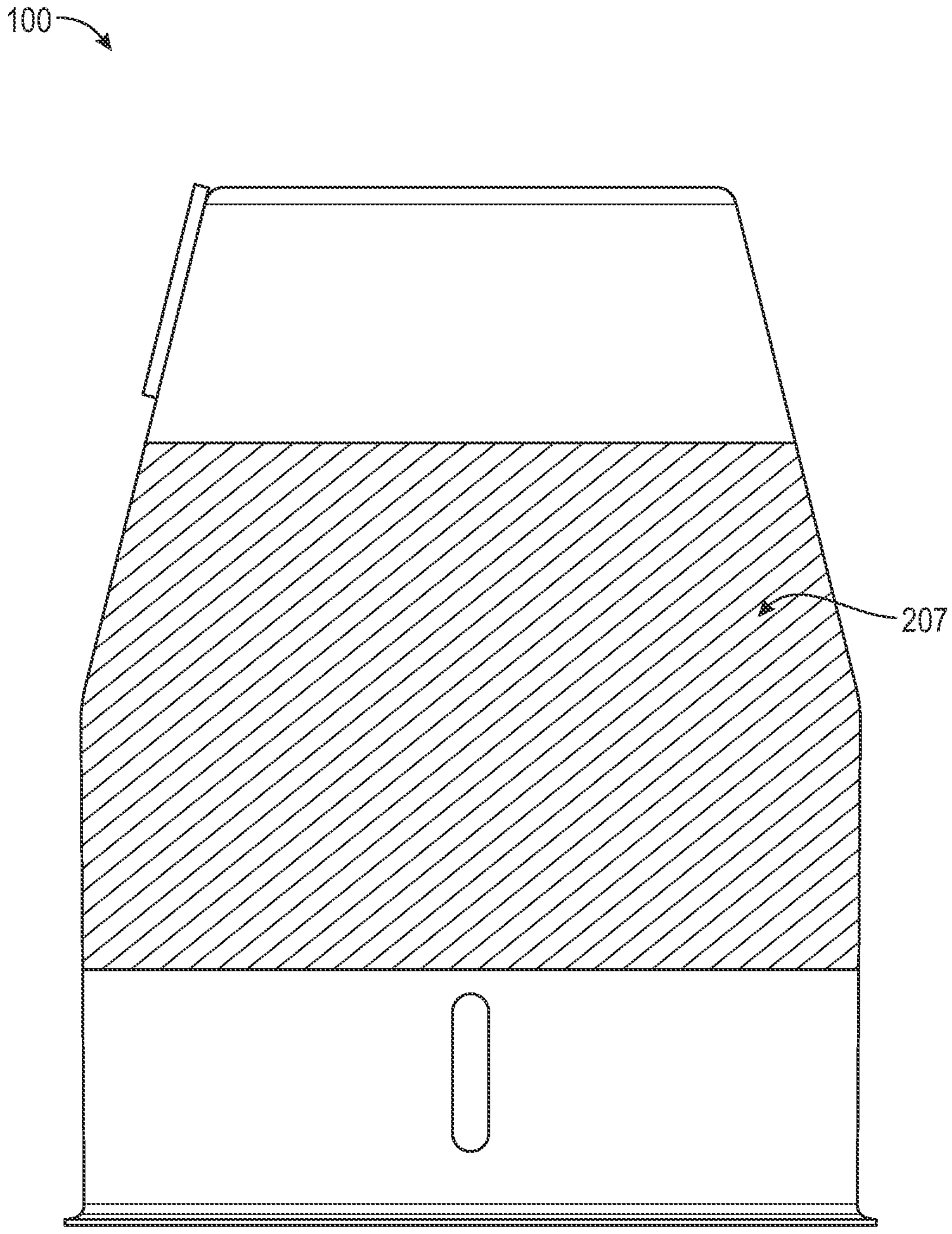
FIG. 2D shows a left-side view of the housing/can of FIG. 1A with an exterior fire-retarding-material deployed in a particular fashion on the housing/can.

FIG. 2D shows a left-side view of housing/can 100 with (middle) fire-retarding-material 207. In some embodiments, a middle exterior of housing/can 100 may be covered with (middle) fire-retarding-material 207. In some embodiments, (middle) fire-retarding-material 207 may be deployed on top of the middle exterior of housing/can 100 in at least one layer. In some embodiments, (middle) fire-retarding-material 207 may be deployed on top of the middle exterior of housing/can 100 in one or more layer(s). In some embodiments, (middle) fire-retarding-material 207 may be a shell with a shape that is complimentary (matching) to a middle exterior shape of housing/can 100. In some embodiments, at least most of interior surfaces of (middle) fire-retarding-material 207 may be physically touching the middle exterior surfaces of housing/can 100. In some embodiments, (middle) fire-retarding-material 207 of housing/can 100 may be of at least a substantially (mostly) uniform thickness.

Continuing discussing FIG. 2D, in some embodiments, the middle exterior of sidewall 101 may be covered with (middle) fire-retarding-material 207. In some embodiments, (middle) fire-retarding-material 207 may be deployed on top of the middle exterior of sidewall 101 in at least one layer. In some embodiments, (middle) fire-retarding-material 207 may be deployed on top of the middle exterior of sidewall 101 in one or more layer(s). In some embodiments, (middle) fire-retarding-material 207 may be a shell with a shape that is complimentary to a middle exterior shape of sidewall 101. In some embodiments, at least most of interior surfaces of (middle) fire-retarding-material 207 may be physically touching the middle exterior surfaces of sidewall 101. In some embodiments, (middle) fire-retarding-material 207 of sidewall 101 may be of at least a substantially (mostly) uniform thickness.

Continuing discussing FIG. 2D, in some embodiments, the top exterior of cylindrical-sidewall 103 and the bottom exterior of conical-sidewall 105 may be covered with (middle) fire-retarding-material 207. In some embodiments, (middle) fire-retarding-material 207 may be deployed on top of the top exterior of cylindrical-sidewall 103 and the bottom exterior of conical-sidewall 105 in at least one layer. In some embodiments, (middle) fire-retarding-material 207 may be deployed on top of the top exterior of cylindrical-sidewall 103 and the bottom exterior of conical-sidewall 105 in one or more layer(s). In some embodiments, (middle) fire-retarding-material 207 may be a shell with a shape that is complimentary to an exterior shape of the top of cylindrical-sidewall 103 and of the bottom exterior shape of conical-sidewall 105. In some embodiments, at least most of interior surfaces of (middle) fire-retarding-material 207 may be physically touching the top exterior surfaces of cylindrical-sidewall 103 and the bottom exterior surfaces of conical-sidewall 105. In some embodiments, (middle) fire-retarding-material 207 of the top exterior of cylindrical-sidewall 103 and the bottom exterior of conical-sidewall 105 may be of at least a substantially (mostly) uniform thickness.

Continuing discussing FIG. 2D, in some embodiments, (middle) fire-retarding-material 207 may not extend to one or more of: exterior of top 111, the top exterior of conical-sidewall 105, the upper (top portion) exterior of sidewall 101, the upper (top portion) exterior of housing/can 100, the bottom exterior of cylindrical-sidewall 103, the lower (bottom portion) exterior of sidewall 101, the lower (bottom portion) exterior of housing/can 100, portions thereof, combinations thereof, and/or the like. In some embodiments, (middle) fire-retarding-material 207 may not physically touch one or more of: exterior of top 111, the top exterior of conical-sidewall 105, the upper (top portion) exterior of sidewall 101, the upper (top portion) exterior of housing/can 100, the bottom exterior of cylindrical-sidewall 103, the lower (bottom portion) exterior of sidewall 101, the lower (bottom portion) exterior of housing/can 100, portions thereof, combinations thereof, and/or the like. In some embodiments, exterior of top 111, the top exterior of conical-sidewall 105, the upper (top portion) exterior of sidewall 101, the upper (top portion) exterior of housing/can 100, the bottom exterior of cylindrical-sidewall 103, the lower (bottom portion) exterior of sidewall 101, the lower (bottom portion) exterior of housing/can 100, portions thereof, combinations thereof, and/or the like may be devoid of fire-retarding-material. In some embodiments, at least some of: exterior of top 111, the top exterior of conical-sidewall 105, the upper (top portion) exterior of sidewall 101, the upper (top portion) exterior of housing/can 100, the bottom exterior of cylindrical-sidewall 103, the lower (bottom portion) exterior of sidewall 101, the lower (bottom portion) exterior of housing/can 100, portions thereof, combinations thereof, and/or the like, may be devoid of fire-retarding-material. In some embodiments, at least most of: exterior of top 111, the top exterior of conical-sidewall 105, the upper (top portion) exterior of sidewall 101, the upper (top portion) exterior of housing/can 100, the bottom exterior of cylindrical-sidewall 103, the lower (bottom portion) exterior of sidewall 101, the lower (bottom portion) exterior of housing/can 100, portions thereof, combinations thereof, and/or the like, may be devoid of fire-retarding-material.

Continuing discussing FIG. 2D, in some embodiments, the at least one fire-retarding material of housing/can 100 may be physically touching (and/or attached to) at least some portion of sidewall 101 when sidewall 101 is in the cool-state (non-fire state). In some embodiments, that at least some portion of sidewall 101 may be a middle exterior portion of sidewall 101. See e.g., FIG. 2D.

Figure 2E:
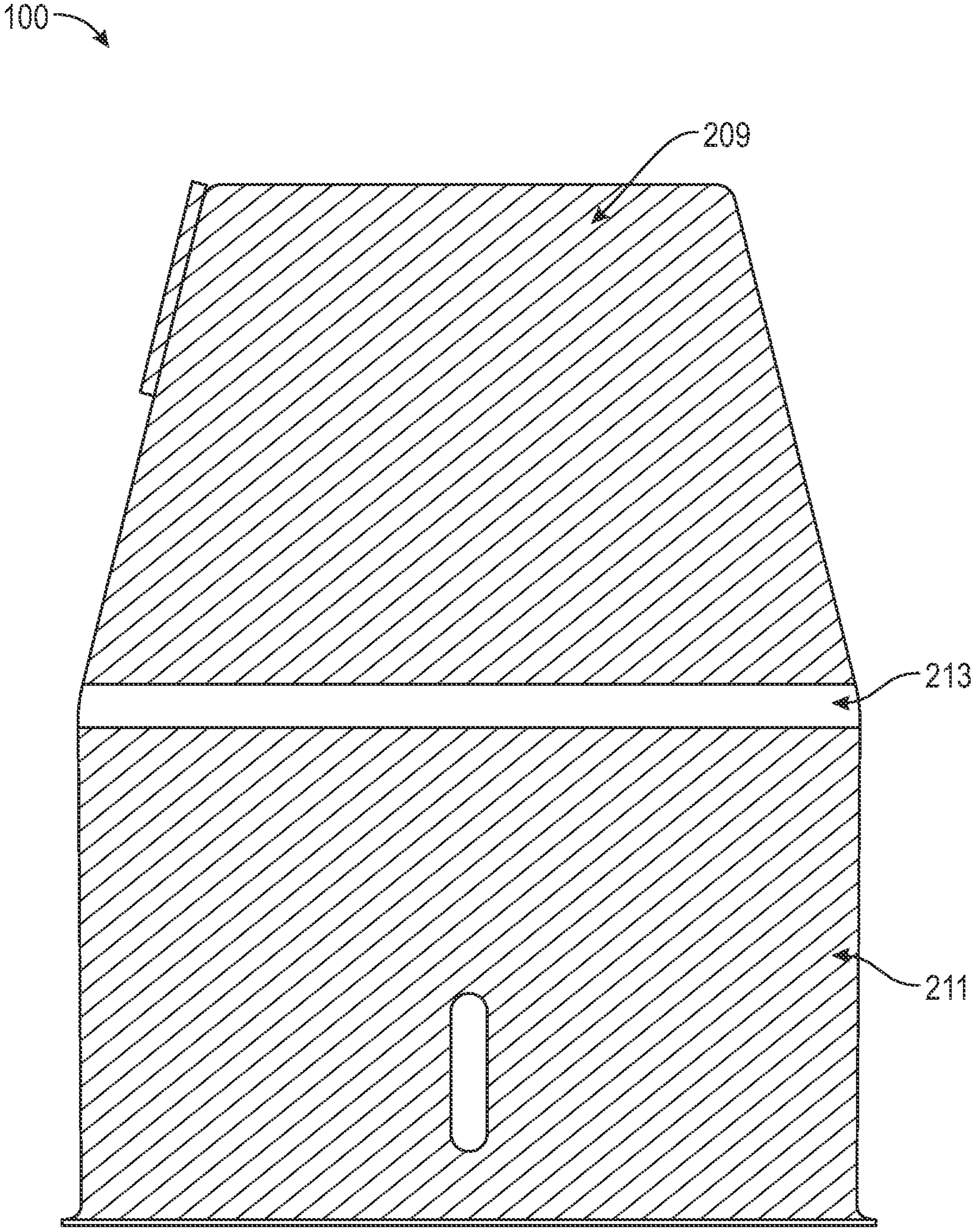
FIG. 2E shows a left-side view of the housing/can of FIG. 1A with an exterior fire-retarding-material deployed in a particular fashion on the housing/can.

FIG. 2E shows a left-side view of housing/can 100 with upper-fire-retarding-material 209 and lower-fire-retarding-material 211. The embodiment of housing/can 100 shown in FIG. 2E may be somewhat similar to the embodiment of housing/can 100 shown in FIG. 2A, except in FIG. 2E the fire-retarding-material is broken into two separate regions of fire-retarding-material by upper-fire-retarding-material 209 and lower-fire-retarding-material 211, respectively. In some embodiments, upper-fire-retarding-material 209 and lower-fire-retarding-material 211, may be separated from each other by band-of-no-fire-retarding-material 213. In some embodiments, band-of-no-fire-retarding-material 213 may be a band running around an outside/exterior circumference of sidewall 101 that is devoid of fire-retarding-material. In some embodiments, band-of-no-fire-retarding-material 213 may have a uniform/fixed height (i.e., a uniform gap between upper-fire-retarding-material 209 and lower-fire-retarding-material 211). In some embodiments, band-of-no-fire-retarding-material 213 may have a variable height (i.e., a variable gap between upper-fire-retarding-material 209 and lower-fire-retarding-material 211).

Continuing discussing FIG. 2E, in some embodiments, an upper (top portion) exterior of housing/can 100 may be covered with upper-fire-retarding-material 209. In some embodiments, upper-fire-retarding-material 209 may be deployed on top of the upper (top portion) exterior of housing/can 100 in at least one layer. In some embodiments, upper-fire-retarding-material 209 may be deployed on top of the upper (top portion) exterior of housing/can 100 in one or more layer(s). In some embodiments, upper-fire-retarding-material 209 may be a shell with a shape that is complimentary (matching) to an upper (top portion) exterior shape of housing/can 100. In some embodiments, at least most of interior surfaces of upper-fire-retarding-material 209 may be physically touching the upper (top portion) exterior surfaces of housing/can 100. In some embodiments, upper-fire-retarding-material 209 of housing/can 100 may be of at least a substantially (mostly) uniform thickness.

Continuing discussing FIG. 2E, in some embodiments, the upper (top portion) exterior of sidewall 101 (and/or of top 111) may be covered with upper-fire-retarding-material 209. In some embodiments, upper-fire-retarding-material 209 may be deployed on top of the upper (top portion) exterior of sidewall 101 (and/or of top 111) in at least one layer. In some embodiments, upper-fire-retarding-material 209 may be deployed on top of the upper (top portion) exterior of sidewall 101 (and/or of top 111) in one or more layer(s). In some embodiments, upper-fire-retarding-material 209 may be a shell with a shape that is complimentary (matching) to an upper (top portion) exterior shape of sidewall 101 (and/or of top 111). In some embodiments, at least most of interior surfaces of upper-fire-retarding-material 209 may be physically touching the upper (top portion) exterior surfaces of sidewall 101 (and/or of top 111). In some embodiments, upper-fire-retarding-material 209 of sidewall 101 (and/or of top 111) may be of at least a substantially (mostly) uniform thickness.

Continuing discussing FIG. 2E, in some embodiments, the exterior of conical-sidewall 105 (and/or of top 111) may be covered with upper-fire-retarding-material 209. In some embodiments, upper-fire-retarding-material 209 may be deployed on top of the exterior of conical-sidewall 105 (and/or of top 111) in at least one layer. In some embodiments, fire-upper-fire-retarding-material 209 may be deployed on top of the exterior of conical-sidewall 105 (and/or of top 111) in one or more layer(s). In some embodiments, upper-fire-retarding-material 209 may be a shell with a shape that is complimentary (matching) to an exterior shape of conical-sidewall 105 (and/or of top 111). In some embodiments, at least most of interior surfaces of upper-fire-retarding-material 209 may be physically touching the exterior surfaces of conical-sidewall 105 (and/or of top 111). In some embodiments, upper-fire-retarding-material 209 of conical-sidewall 105 (and/or of top 111) may be of at least a substantially (mostly) uniform thickness.

Continuing discussing FIG. 2E, in some embodiments, upper-fire-retarding-material 209 may not extend to one or more of: cylindrical-sidewall 103, the lower (bottom portion) exterior of sidewall 101, the lower (bottom portion) exterior of housing/can 100, portions thereof, combinations thereof, and/or the like. In some embodiments, upper-fire-retarding-material 209 may not physically touch one or more of: cylindrical-sidewall 103, the lower (bottom portion) exterior of sidewall 101, the lower (bottom portion) exterior of housing/can 100, portions thereof, combinations thereof, and/or the like. In some embodiments, cylindrical-sidewall 103, the lower (bottom portion) exterior of sidewall 101, the lower (bottom portion) exterior of housing/can 100, portions thereof, combinations thereof, and/or the like may be devoid of upper-fire-retarding-material 209. In some embodiments, at least some of: cylindrical-sidewall 103, the lower (bottom portion) exterior of sidewall 101, the lower (bottom portion) exterior of housing/can 100, portions thereof, combinations thereof, and/or the like, may be devoid of upper-fire-retarding-material 209. In some embodiments, at least most of: cylindrical-sidewall 103, the lower (bottom portion) exterior of sidewall 101, the lower (bottom portion) exterior of housing/can 100, portions thereof, combinations thereof, and/or the like, may be devoid of upper-fire-retarding-material 209.

Continuing discussing FIG. 2E, in some embodiments, a lower (bottom portion) exterior of housing/can 100 may be covered with lower-fire-retarding-material 211. In some embodiments, lower-fire-retarding-material 211 may be deployed on top of the lower (bottom portion) exterior of housing/can 100 in at least one layer. In some embodiments, lower-fire-retarding-material 211 may be deployed on top of the lower (bottom portion) exterior of housing/can 100 in one or more layer(s). In some embodiments, lower-fire-retarding-material 211 may be a shell with a shape that is complimentary (matching) to a lower (bottom portion) exterior shape of housing/can 100. In some embodiments, at least most of interior surfaces of lower-fire-retarding-material 211 may be physically touching the lower (bottom portion) exterior surfaces of housing/can 100. In some embodiments, lower-fire-retarding-material 211 of housing/can 100 may be of at least a substantially (mostly) uniform thickness.

Continuing discussing FIG. 2E, in some embodiments, the lower (bottom portion) exterior of sidewall 101 may be covered with lower-fire-retarding-material 211. In some embodiments, lower-fire-retarding-material 211 may be deployed on top of the lower (bottom portion) exterior of sidewall 101 in at least one layer. In some embodiments, lower-fire-retarding-material 211 may be deployed on top of the lower (bottom portion) exterior of sidewall 101 in one or more layer(s). In some embodiments, lower-fire-retarding-material 211 may be a shell with a shape that is complimentary to a lower (bottom portion) exterior shape of sidewall 101. In some embodiments, at least most of interior surfaces of lower-fire-retarding-material 211 may be physically touching the lower (bottom portion) exterior surfaces of sidewall 101. In some embodiments, lower-fire-retarding-material 211 of sidewall 101 may be of at least a substantially (mostly) uniform thickness.

Continuing discussing FIG. 2E, in some embodiments, the exterior of cylindrical-sidewall 103 may be covered with lower-fire-retarding-material 211. In some embodiments, lower-fire-retarding-material 211 may be deployed on top of the exterior of cylindrical-sidewall 103 in at least one layer. In some embodiments, lower-fire-retarding-material 211 may be deployed on top of the exterior of cylindrical-sidewall 103 in one or more layer(s). In some embodiments, lower-fire-retarding-material 211 may be a shell with a shape that is complimentary to an exterior shape of cylindrical-sidewall 103. In some embodiments, at least most of interior surfaces of lower-fire-retarding-material 211 may be physically touching the exterior surfaces of cylindrical-sidewall 103. In some embodiments, lower-fire-retarding-material 211 of cylindrical-sidewall 103 may be of at least a substantially (mostly) uniform thickness.

Continuing discussing FIG. 2E, in some embodiments, lower-fire-retarding-material 211 may not extend to one or more of: top 111, conical-sidewall 105, the upper (top portion) exterior of sidewall 101, the upper (top portion) exterior of housing/can 100, portions thereof, combinations thereof, and/or the like. In some embodiments, lower-fire-retarding-material 211 may not physically touch one or more of: top 111, conical-sidewall 105, the upper (top portion) exterior of sidewall 101, the upper (top portion) exterior of housing/can 100, portions thereof, combinations thereof, and/or the like. In some embodiments, top 111, conical-sidewall 105, the upper (top portion) exterior of sidewall 101, the upper (top portion) exterior of housing/can 100, portions thereof, combinations thereof, and/or the like may be devoid of lower-fire-retarding-material 211. In some embodiments, at least some of: top 111, conical-sidewall 105, the upper (top portion) exterior of sidewall 101, the upper (top portion) exterior of housing/can 100, portions thereof, combinations thereof, and/or the like, may be devoid of lower-fire-retarding-material 211. In some embodiments, at least most of: top 111, conical-sidewall 105, the upper (top portion) exterior of sidewall 101, the upper (top portion) exterior of housing/can 100, portions thereof, combinations thereof, and/or the like, may be devoid of lower-fire-retarding-material 211.

Figure 3A:
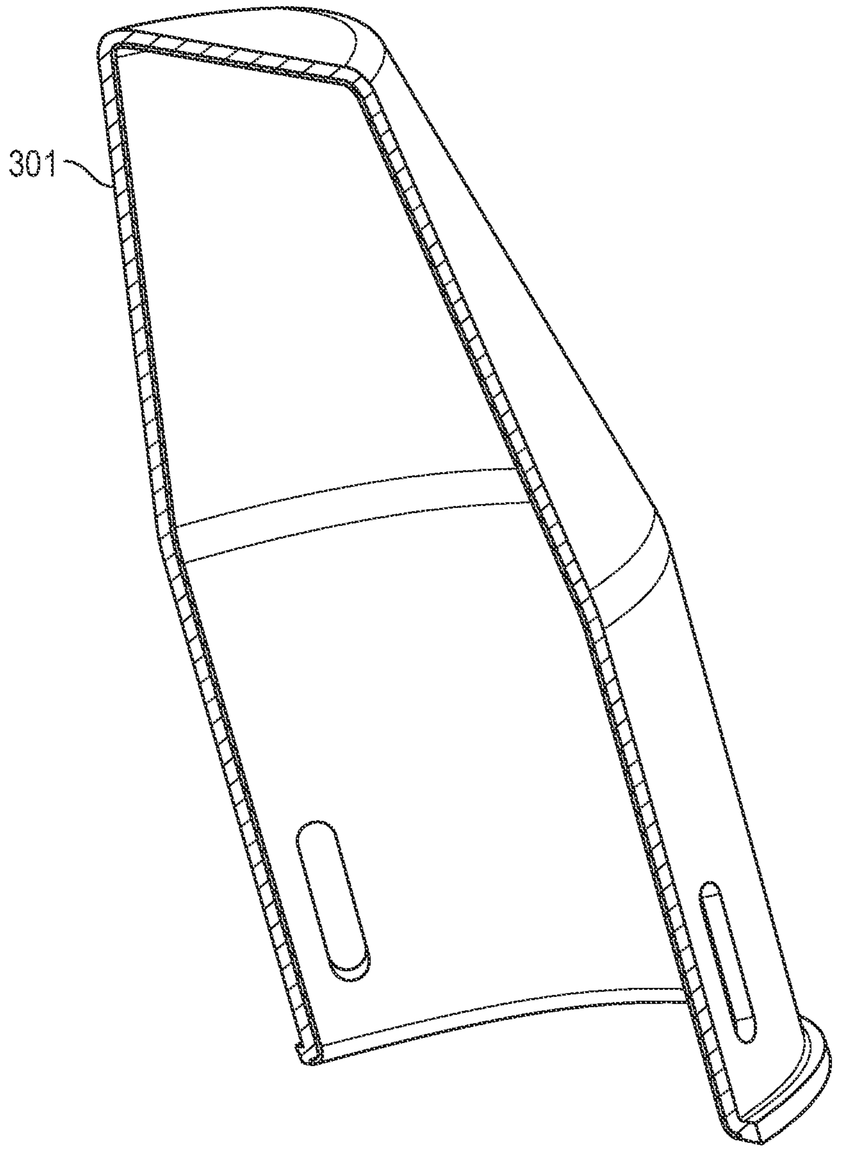
FIG. 3A shows a cross-section perspective view through the housing/can of FIG. 1A with a uniform thickness of a fire-retarding-material.

FIG. 3A shows a cross-section perspective view through housing/can 100 with a uniform-thickness-fire-retarding-material 301. The cross-section perspective view of FIG. 3A runs through the overall length/height of housing/can 100. In some embodiments, uniform-thickness-fire-retarding-material 301 of housing/can 100 and/or of sidewall 101 (and/or of top 111) may be of at least a substantially (mostly) uniform thickness everywhere on exteriors of housing/can 100 and/or of sidewall 101 (and/or of top 111). In some embodiments, an exterior of housing/can 100 may be covered with uniform-thickness-fire-retarding-material 301. In some embodiments, an entire exterior of housing/can 100 may be covered with uniform-thickness-fire-retarding-material 301. In some embodiments, uniform-thickness-fire-retarding-material 301 may be deployed on top of the exterior of housing/can 100 in at least one layer. In some embodiments, uniform-thickness-fire-retarding-material 301 may be deployed on top of the exterior of housing/can 100 in one or more layer(s). In some embodiments, uniform-thickness-fire-retarding-material 301 may be a shell with a shape that is complimentary (matching) to an exterior shape of housing/can 100. In some embodiments, at least most of interior surfaces of uniform-thickness-fire-retarding-material 301 may be physically touching exterior surfaces of housing/can 100.

Continuing discussing FIG. 3A, in some embodiments, an exterior of sidewall 101 (and/or of top 111) may be covered with uniform-thickness-fire-retarding-material 301. In some embodiments, an entire exterior of sidewall 101 (and/or of top 111) may be covered with uniform-thickness-fire-retarding-material 301. In some embodiments, uniform-thickness-fire-retarding-material 301 may be deployed on top of the exterior of sidewall 101 (and/or of top 111) in at least one layer. In some embodiments, uniform-thickness-fire-retarding-material 301 may be deployed on top of the exterior of sidewall 101 (and/or of top 111) in one or more layer(s). In some embodiments, uniform-thickness-fire-retarding-material 301 may be a shell with a shape that is complimentary (matching) to an exterior shape of sidewall 101 (and/or of top 111). In some embodiments, at least most of interior surfaces of uniform-thickness-fire-retarding-material 301 may be physically touching exterior surfaces of sidewall 101 (and/or of top 111).

Continuing discussing FIG. 3A, in some embodiments, the at least one fire-retarding material of housing/can 100 may be physically touching (and/or attached to) at least some portion of sidewall 101 when sidewall 101 is in the cool-state (non-fire state). In some embodiments, a thickness of the at least one fire-retarding material is at least substantially uniform along that at least some portion of sidewall 101. See e.g., FIG. 3A.

Note, the embodiment of housing/can 100 shown in FIG. 3A, utilizing uniform-thickness-fire-retarding-material 301, may be combined and/or implemented with any of the housing/can 100 embodiments of FIG. 2A to FIG. 2E; i.e., any of the fire-retarding-materials of housing/can 100 of FIG. 2A to FIG. 2E may be of a uniform thickness.

Figure 3B:
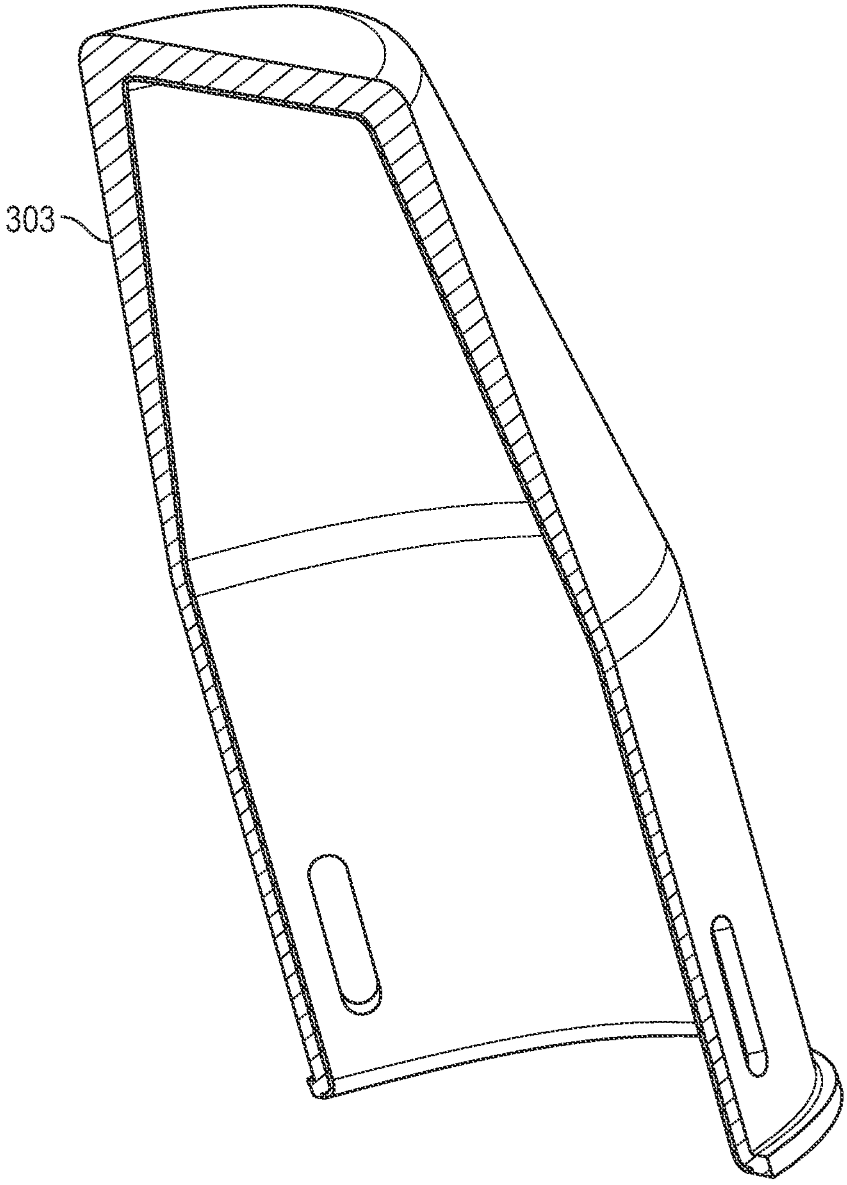
FIG. 3B shows a cross-section perspective view through the housing/can of FIG. 1A with a variable thickness that is thicker towards a top of the housing/can.

FIG. 3B shows a cross-section perspective view through housing/can 100 with an upper-thicker-fire-retarding-material 303. The cross-section perspective view of FIG. 3B runs through the overall length/height of housing/can 100. In some embodiments, upper-thicker-fire-retarding-material 303 may be at least one layer/shell of fire-retarding-material that is thicker towards top 111 and thinner towards bottom 107. In some embodiments, upper-thicker-fire-retarding-material 303 may thickest at top 111 (and/or thickest proximate to top 111 [wherein proximate in this context may be one (1) inch or less]) and thinnest at bottom 107. This configuration/embodiment shown in FIG. 3B may be appropriate for situations when the emitted light and/or the at least one light emitting element tend to be cooler than other electronics within housing/can 100 that are located above the at least one light emitting element within housing/can 100 (wherein the other electronics may be the driver and/or the heat sink). This configuration/embodiment shown in FIG. 3B may be appropriate when the at least one light emitting element may be at least one LED (light emitting diode). Whereas, if the at least one light emitting element and/or the emitted light tend to be hot, as with incandescent/halogen types lights, then this configuration/embodiment shown in FIG. 3B may be inappropriate.

Continuing discussing FIG. 3B, in some embodiments, an exterior of housing/can 100 may be covered with upper-thicker-fire-retarding-material 303. In some embodiments, an entire exterior of housing/can 100 may be covered with upper-thicker-fire-retarding-material 303. In some embodiments, upper-thicker-fire-retarding-material 303 may be deployed on top of the exterior of housing/can 100 in at least one layer. In some embodiments, upper-thicker-fire-retarding-material 303 may be deployed on top of the exterior of housing/can 100 in one or more layer(s). In some embodiments, upper-thicker-fire-retarding-material 303 may be a shell with a shape that is complimentary (matching) to an exterior shape of housing/can 100. In some embodiments, at least most of interior surfaces of upper-thicker-fire-retarding-material 303 may be physically touching exterior surfaces of housing/can 100.

Continuing discussing FIG. 3B, in some embodiments, an exterior of sidewall 101 (and/or of top 111) may be covered with upper-thicker-fire-retarding-material 303. In some embodiments, an entire exterior of sidewall 101 (and/or of top 111) may be covered with upper-thicker-fire-retarding-material 303. In some embodiments, upper-thicker-fire-retarding-material 303 may be deployed on top of the exterior of sidewall 101 (and/or of top 111) in at least one layer. In some embodiments, upper-thicker-fire-retarding-material 303 may be deployed on top of the exterior of sidewall 101 (and/or of top 111) in one or more layer(s). In some embodiments, upper-thicker-fire-retarding-material 303 may be a shell with a shape that is complimentary (matching) to an exterior shape of sidewall 101 (and/or of top 111). In some embodiments, at least most of interior surfaces of upper-thicker-fire-retarding-material 303 may be physically touching exterior surfaces of sidewall 101 (and/or of top 111).

Continuing discussing FIG. 3B, in some embodiments, the at least one fire-retarding material of housing/can 100 may be physically touching (and/or attached to) at least some portion of sidewall 101 when sidewall 101 is in the cool-state (non-fire state). In some embodiments, a thickness of the at least one fire-retarding material may be variable along that at least some portion of sidewall 101. See e.g., FIG. 3B. See also, FIG. 3C.

Continuing discussing FIG. 3B, in some embodiments, the at least one fire-retarding material of housing/can 100 may be physically touching (and/or attached to) at least some portion of sidewall 101 when sidewall 101 is in the cool-state (non-fire state). In some embodiments, a thickness of the at least one fire-retarding material may be variable along that at least some portion of sidewall 101. In some embodiments, the at least some portion of sidewall 101 may be an entire exterior of sidewall 101. In some embodiments, this thickness may be thicker towards top 111 and thinner towards bottom 107. See e.g., FIG. 3B.

Note, the embodiment of housing/can 100 shown in FIG. 3B, utilizing upper-thicker-fire-retarding-material 303, may be combined and/or implemented with any of the housing/can 100 embodiments of FIG. 2A to FIG. 2E; i.e., any of the fire-retarding-materials of housing/can 100 of FIG. 2A to FIG. 2E may be of a thickness that is thicker towards top 111 and thinner towards bottom 107.

Figure 3C:
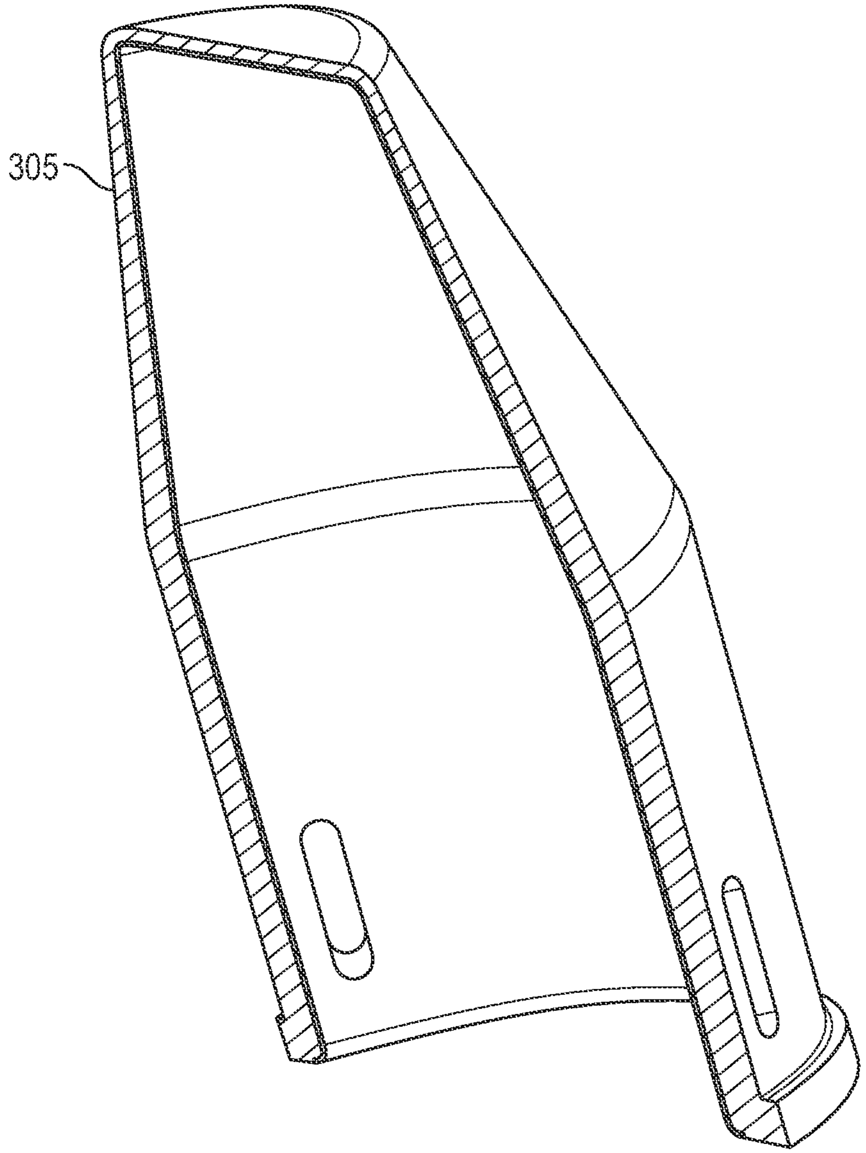
FIG. 3C shows a cross-section perspective view through the housing/can of FIG. 1A with a variable thickness that is thicker towards a bottom of the housing/can.

FIG. 3C shows a cross-section perspective view through housing/can 100 with a lower-thicker-fire-retarding-material 305. The cross-section perspective view of FIG. 3C runs through the overall length/height of housing/can 100. In some embodiments, lower-thicker-fire-retarding-material 305 may be at least one layer/shell of fire-retarding-material that is thicker towards bottom 107 and thinner towards top 111. In some embodiments, lower-thicker-fire-retarding-material 305 may thickest at bottom 107 and thinnest at top 111 (and/or thinnest proximate to top 111 [wherein proximate in this context may be one (1) inch or less]). This configuration/embodiment shown in FIG. 3C may be appropriate for situations when the emitted light and/or the at least one light emitting element tend to be hotter than other electronics within housing/can 100 that are located above the at least one light emitting element within housing/can 100. This configuration/embodiment shown in FIG. 3C may be appropriate when the at least one light emitting element may be at least one incandescent/halogen type light or the like. Whereas, if the at least one light emitting element and/or the emitted light tend to be cooler, as with LED (light emitting diode) type lights or the like, then this configuration/embodiment shown in FIG. 3C may be inappropriate.

Continuing discussing FIG. 3C, in some embodiments, an exterior of housing/can 100 may be covered with lower-thicker-fire-retarding-material 305. In some embodiments, an entire exterior of housing/can 100 may be covered with lower-thicker-fire-retarding-material 305. In some embodiments, lower-thicker-fire-retarding-material 305 may be deployed on top of the exterior of housing/can 100 in at least one layer. In some embodiments, lower-thicker-fire-retarding-material 305 may be deployed on top of the exterior of housing/can 100 in one or more layer(s). In some embodiments, lower-thicker-fire-retarding-material 305 may be a shell with a shape that is complimentary (matching) to an exterior shape of housing/can 100. In some embodiments, at least most of interior surfaces of lower-thicker-fire-retarding-material 305 may be physically touching exterior surfaces of housing/can 100.

Continuing discussing FIG. 3C, in some embodiments, an exterior of sidewall 101 (and/or of top 111) may be covered with lower-thicker-fire-retarding-material 305. In some embodiments, an entire exterior of sidewall 101 (and/or of top 111) may be covered with lower-thicker-fire-retarding-material 305. In some embodiments, lower-thicker-fire-retarding-material 305 may be deployed on top of the exterior of sidewall 101 (and/or of top 111) in at least one layer. In some embodiments, lower-thicker-fire-retarding-material 305 may be deployed on top of the exterior of sidewall 101 (and/or of top 111) in one or more layer(s). In some embodiments, lower-thicker-fire-retarding-material 305 may be a shell with a shape that is complimentary (matching) to an exterior shape of sidewall 101 (and/or of top 111). In some embodiments, at least most of interior surfaces of lower-thicker-fire-retarding-material 305 may be physically touching exterior surfaces of sidewall 101 (and/or of top 111).

Continuing discussing FIG. 3C, in some embodiments, the at least one fire-retarding material of housing/can 100 may be physically touching (and/or attached to) at least some portion of sidewall 101 when sidewall 101 is in the cool-state (non-fire state). In some embodiments, a thickness of the at least one fire-retarding material may be variable along that at least some portion of sidewall 101. In some embodiments, the at least some portion of sidewall 101 may be an entire exterior of sidewall 101. In some embodiments, this thickness may be thicker towards bottom 107 and thinner towards top 111. See e.g., FIG. 3C.

Note, the embodiment of housing/can 100 shown in FIG. 3C, utilizing lower-thicker-fire-retarding-material 305, may be combined and/or implemented with any of the housing/can 100 embodiments of FIG. 2A to FIG. 2E; i.e., any of the fire-retarding-materials of housing/can 100 of FIG. 2A to FIG. 2E may be of a thickness that is thicker towards bottom 107 and thinner towards top 111.

Figure 3D:
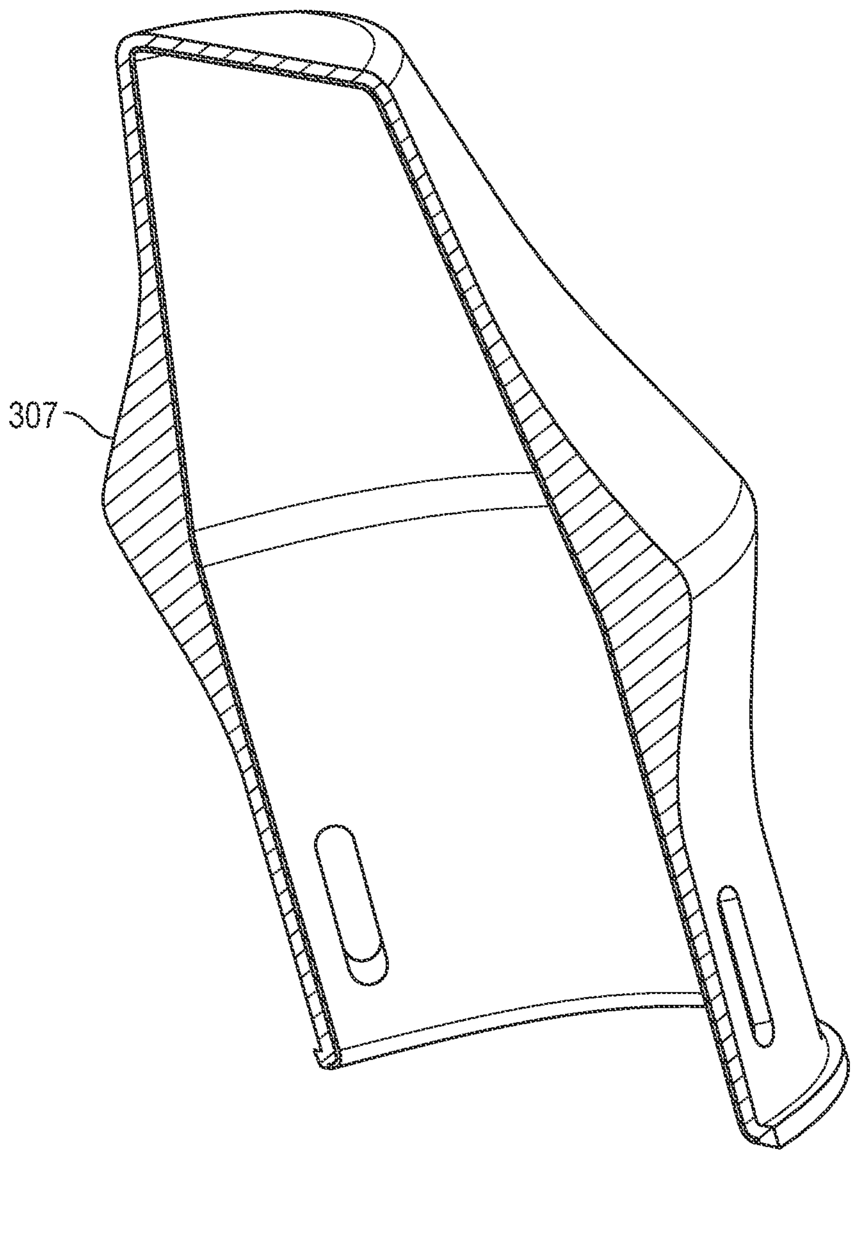
FIG. 3D shows a cross-section perspective view through the housing/can of FIG. 1A with a variable thickness that is thicker towards a middle portion of the housing/can.

FIG. 3D shows a cross-section perspective view through housing/can 100 with a middle-thicker-fire-retarding-material 307. The cross-section perspective view of FIG. 3D runs through the overall length/height of housing/can 100. In some embodiments, middle-thicker-fire-retarding-material 307 may be at least one layer/shell of fire-retarding-material that is thicker disposed away from bottom 107 and thicker disposed away from top 111. In some embodiments, middle-thicker-fire-retarding-material 307 may thinnest at bottom 107 and thinnest at top 111 (and/or thinnest proximate to top 111 [wherein proximate in this context may be one (1) inch or less]). This configuration/embodiment shown in FIG. 3D may result in a bulge of fire-retarding-material that is the thickest portion of that fire-retarding-material being disposed away from bottom 107 and being disposed away from top 111. In some embodiments, this bulge of thickest fire-retarding-material (of middle-thicker-fire-retarding-material 307) may be located in a middle of housing/can 100, with respect to an overall length/height of housing/can 100. In some embodiments, this bulge of thickest fire-retarding-material (of middle-thicker-fire-retarding-material 307) may be located in a middle of housing/can 100, with respect to an overall length/height of housing/can 100. In some embodiments, this bulge of thickest fire-retarding-material (of middle-thicker-fire-retarding-material 307) may be located on an exterior of housing/can 100, such that this bulge is closest to the hottest electronics within housing/can 100. This configuration/embodiment shown in FIG. 3D may be appropriate for situations when the emitted light and/or the at least one light emitting element tend to be cooler than other electronics within housing/can 100 that are located above the at least one light emitting element within housing/can 100 (wherein the other electronics may be the driver and/or the heat sink). This configuration/embodiment shown in FIG. 3D may be appropriate when the at least one light emitting element may be at least one LED (light emitting diode) or the like.

Continuing discussing FIG. 3D, in some embodiments, an exterior of housing/can 100 may be covered with middle-thicker-fire-retarding-material 307. In some embodiments, an entire exterior of housing/can 100 may be covered with middle-thicker-fire-retarding-material 307. In some embodiments, middle-thicker-fire-retarding-material 307 may be deployed on top of the exterior of housing/can 100 in at least one layer. In some embodiments, middle-thicker-fire-retarding-material 307 may be deployed on top of the exterior of housing/can 100 in one or more layer(s). In some embodiments, middle-thicker-fire-retarding-material 307 may be a shell with a shape that is complimentary (matching) to an exterior shape of housing/can 100. In some embodiments, at least most of interior surfaces of middle-thicker-fire-retarding-material 307 may be physically touching exterior surfaces of housing/can 100.

Continuing discussing FIG. 3D, in some embodiments, an exterior of sidewall 101 (and/or of top 111) may be covered with middle-thicker-fire-retarding-material 307. In some embodiments, an entire exterior of sidewall 101 (and/or of top 111) may be covered with middle-thicker-fire-retarding-material 307. In some embodiments, middle-thicker-fire-retarding-material 307 may be deployed on top of the exterior of sidewall 101 (and/or of top 111) in at least one layer. In some embodiments, middle-thicker-fire-retarding-material 307 may be deployed on top of the exterior of sidewall 101 (and/or of top 111) in one or more layer(s). In some embodiments, middle-thicker-fire-retarding-material 307 may be a shell with a shape that is complimentary (matching) to an exterior shape of sidewall 101 (and/or of top 111). In some embodiments, at least most of interior surfaces of middle-thicker-fire-retarding-material 307 may be physically touching exterior surfaces of sidewall 101 (and/or of top 111).

Continuing discussing FIG. 3D, in some embodiments, the at least one fire-retarding material of housing/can 100 may be physically touching (and/or attached to) at least some portion of sidewall 101 when sidewall 101 is in the cool-state (non-fire state). In some embodiments, a thickness of the at least one fire-retarding material may be variable along that at least some portion of sidewall 101. In some embodiments, the at least some portion of sidewall 101 may be an entire exterior of sidewall 101. In some embodiments, this thickness may be thicker towards a middle of sidewall 101, thinner towards bottom 107, and also thinner towards top 111. In some embodiments, this thickness may be thickest at a portion of sidewall 101 that may be closest to where the at least one driver may be housed within the internal-volume of housing/can 100 and thinner at locations of sidewall 101 that are disposed further away from where the at least one driver may be housed within the internal-volume. See e.g., FIG. 3D.

Note, the embodiment of housing/can 100 shown in FIG. 3D, utilizing middle-thicker-fire-retarding-material 307, may be combined and/or implemented with any of the housing/can 100 embodiments of FIG. 2A to FIG. 2E; i.e., any of the fire-retarding-materials of housing/can 100 of FIG. 2A to FIG. 2E may be of a thickness that is thicker disposed away from bottom 107 and disposed away from top 111 (or thinnest at both bottom 107 and at top 111).

Figure 4A:
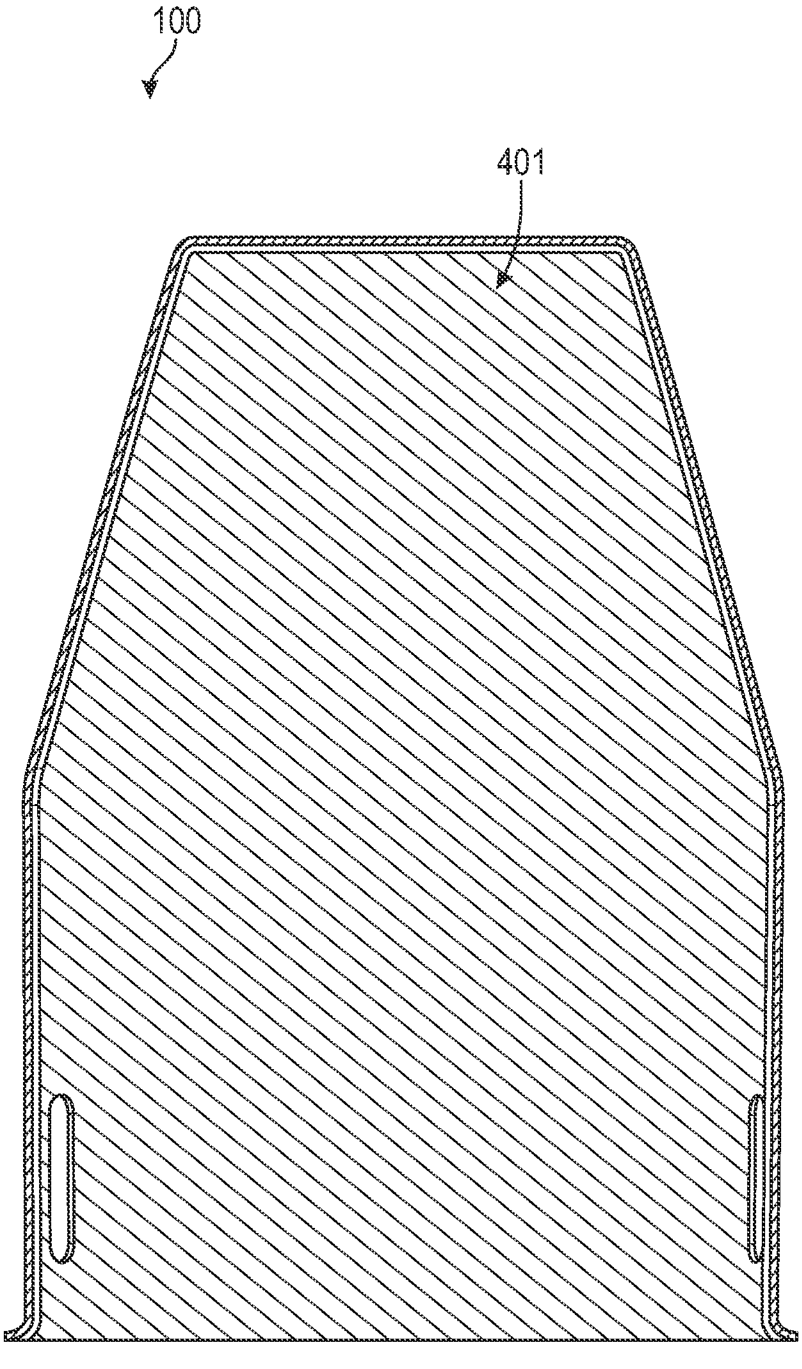
FIG. 4A shows a left-side cross-sectional view through the housing/can of FIG. 1A with an interior fire-retarding-material deployed in a particular fashion on the housing/can.

FIG. 4A shows a left-side cross-sectional view through housing/can 100 with fire-retarding-material 401. In some embodiments, an interior of housing/can 100 may be covered with fire-retarding-material 401. In some embodiments, an entire interior of housing/can 100 may be covered with fire-retarding-material 401. In some embodiments, fire-retarding-material 401 may be deployed on top of the interior surface(s) of housing/can 100 in at least one layer. In some embodiments, fire-retarding-material 401 may be deployed on top of the interior surface(s) of housing/can 100 in one or more layer(s). In some embodiments, fire-retarding-material 401 may be a shell with a shape that is complimentary (matching) to an interior shape of housing/can 100. In some embodiments, at least most of interior surfaces of fire-retarding-material 401 may be physically touching interior surfaces of housing/can 100. In some embodiments, fire-retarding-material 401 of housing/can 100 may be of at least a substantially (mostly) uniform thickness.

Continuing discussing FIG. 4A, in some embodiments, interior surface(s) of sidewall-interior 119 (and/or of top-interior 117) may be covered with fire-retarding-material 401. In some embodiments, entire interior surface(s) of sidewall-interior 119 (and/or of top-interior 117) may be covered with fire-retarding-material 401. In some embodiments, fire-retarding-material 401 may be deployed on top of the interior surface(s) of sidewall-interior 119 (and/or of top-interior 117) in at least one layer. In some embodiments, fire-retarding-material 401 may be deployed on top of the interior surface(s) of sidewall-interior 119 (and/or of top-interior 117) in one or more layer(s). In some embodiments, fire-retarding-material 401 may be a shell with a shape that is complimentary (matching) to an interior shape of sidewall-interior 119 (and/or of top-interior 117). In some embodiments, at least most of interior surfaces of fire-retarding-material 401 may be physically touching interior surfaces of sidewall-interior 119 (and/or of top-interior 117). In some embodiments, fire-retarding-material 401 of sidewall-interior 119 (and/or of top-interior 117) may be of at least a substantially (mostly) uniform thickness.

Continuing discussing FIG. 4A, in some embodiments, the at least one fire-retarding material of housing/can 100 may be physically touching (and/or attached to) at least some portion of sidewall 101 when sidewall 101 is in the cool-state (non-fire state). In some embodiments, that at least some portion of sidewall 101 may be an entire interior of sidewall 101 (sidewall-interior 119). See e.g., FIG. 4A.

Note, the embodiment of housing/can 100 shown in FIG. 4A, utilizing fire-retarding-material 401, may be combined and/or implemented with any of the housing/can 100 embodiments of FIG. 2A to FIG. 3D.

Figure 4B:
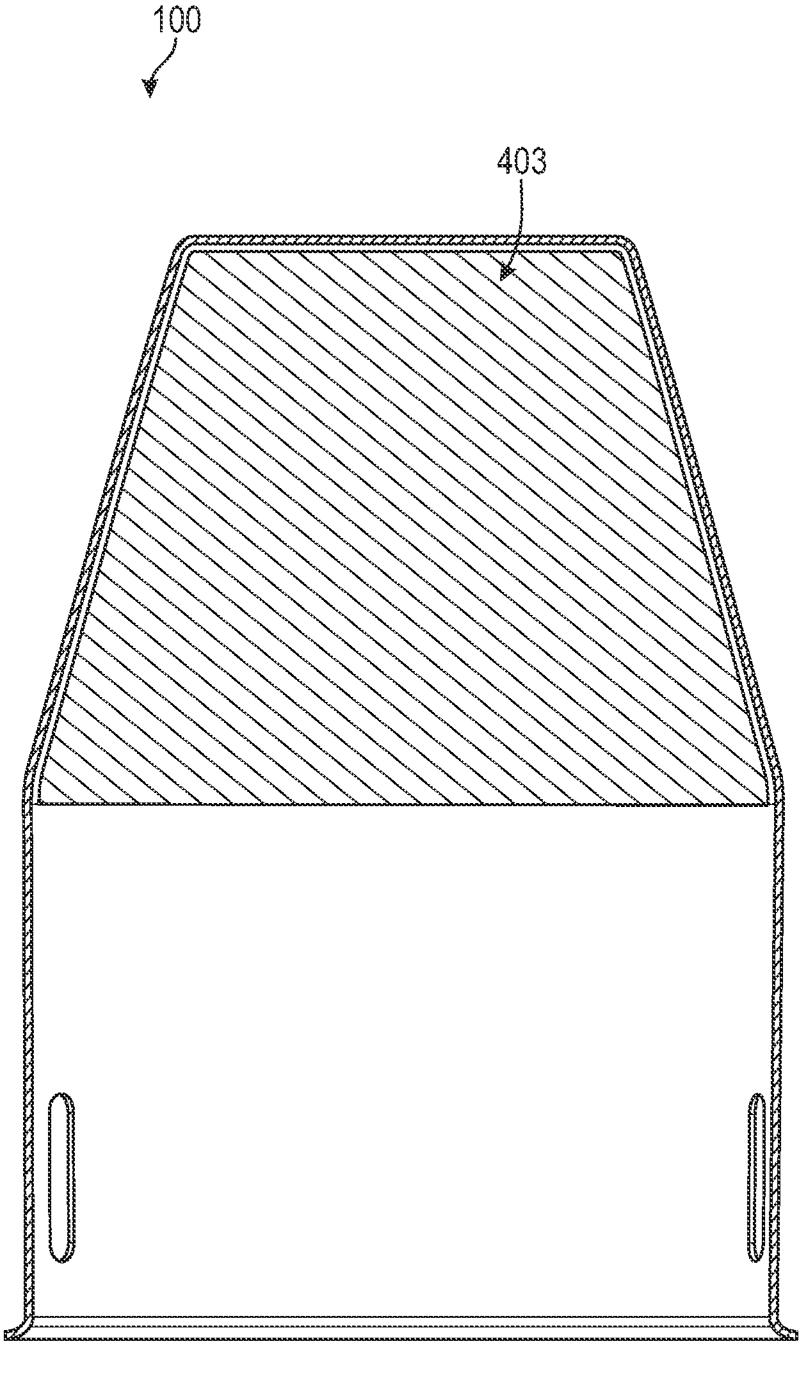
FIG. 4B shows a left-side cross-sectional view through the housing/can of FIG. 1A with an interior fire-retarding-material deployed in a particular fashion on the housing/can.

FIG. 4B shows a left-side cross-sectional view through housing/can 100 with fire-retarding-material 403. In some embodiments, upper (top portion) interior surface(s) of housing/can 100 may be covered with fire-retarding-material 403. In some embodiments, fire-retarding-material 403 may be deployed on top of the upper (top portion) interior surface(s) of housing/can 100 in at least one layer. In some embodiments, fire-retarding-material 403 may be deployed on top of the upper (top portion) interior surface(s) of housing/can 100 in one or more layer(s). In some embodiments, fire-retarding-material 403 may be a shell with a shape that is complimentary (matching) to an upper (top portion) interior shape of housing/can 100. In some embodiments, at least most of interior surfaces of fire-retarding-material 403 may be physically touching the upper (top portion) interior surfaces of housing/can 100. In some embodiments, fire-retarding-material 403 of housing/can 100 may be of at least a substantially (mostly) uniform thickness.

Continuing discussing FIG. 4B, in some embodiments, the upper (top portion) interior surface(s) of sidewall-interior 119 (and/or of top-interior 117) may be covered with fire-retarding-material 403. In some embodiments, fire-retarding-material 403 may be deployed on top of the upper (top portion) interior surface(s) of sidewall-interior 119 (and/or of top-interior 117) in at least one layer. In some embodiments, fire-retarding-material 403 may be deployed on top of the upper (top portion) interior surface(s) of sidewall-interior 119 (and/or of top-interior 117) in one or more layer(s). In some embodiments, fire-retarding-material 403 may be a shell with a shape that is complimentary (matching) to an upper (top portion) interior shape of sidewall-interior 119 (and/or of top-interior 117). In some embodiments, at least most of interior surfaces of fire-retarding-material 403 may be physically touching the upper (top portion) interior surfaces of sidewall-interior 119 (and/or of top-interior 117). In some embodiments, fire-retarding-material 403 of sidewall-interior 119 (and/or of top-interior 117) may be of at least a substantially (mostly) uniform thickness.

Continuing discussing FIG. 4B, in some embodiments, the interior surface(s) of conical-sidewall 105 (and/or of top-interior 117) may be covered with fire-retarding-material 403. In some embodiments, fire-retarding-material 403 may be deployed on top of the interior surface(s) of conical-sidewall 105 (and/or of top-interior 117) in at least one layer. In some embodiments, fire-retarding-material 403 may be deployed on top of the interior surface(s) of conical-sidewall 105 (and/or of top-interior 117) in one or more layer(s). In some embodiments, fire-retarding-material 403 may be a shell with a shape that is complimentary (matching) to an interior shape of conical-sidewall 105 (and/or of top-interior 117). In some embodiments, at least most of interior surfaces of fire-retarding-material 403 may be physically touching the interior surfaces of conical-sidewall 105 (and/or of top-interior 117). In some embodiments, fire-retarding-material 403 of conical-sidewall 105 (and/or of top-interior 117) may be of at least a substantially (mostly) uniform thickness.

Continuing discussing FIG. 4B, in some embodiments, fire-retarding-material 403 may not extend to one or more of: interior surface(s) of cylindrical-sidewall 103, the lower (bottom portion) interior surface(s) of sidewall-interior 119, the lower (bottom portion) interior surface(s) of housing/can 100, portions thereof, combinations thereof, and/or the like. In some embodiments, fire-retarding-material 403 may not physically touch one or more of: interior surface(s) of cylindrical-sidewall 103, the lower (bottom portion) interior surface(s) of sidewall-interior 119, the lower (bottom portion) interior surface(s) of housing/can 100, portions thereof, combinations thereof, and/or the like. In some embodiments, interior surface(s) of cylindrical-sidewall 103, the lower (bottom portion) interior surface(s) of sidewall-interior 119, the lower (bottom portion) interior surface(s) of housing/can 100, portions thereof, combinations thereof, and/or the like may be devoid of fire-retarding-material. In some embodiments, at least some of: interior surface(s) of cylindrical-sidewall 103, the lower (bottom portion) interior surface(s) of sidewall-interior 119, the lower (bottom portion) interior surface(s) of housing/can 100, portions thereof, combinations thereof, and/or the like, may be devoid of fire-retarding-material. In some embodiments, at least most of: interior surface(s) of cylindrical-sidewall 103, the lower (bottom portion) interior surface(s) of sidewall-interior 119, the lower (bottom portion) interior surface(s) of housing/can 100, portions thereof, combinations thereof, and/or the like, may be devoid of fire-retarding-material.

Continuing discussing FIG. 4B, in some embodiments, the at least one fire-retarding material of housing/can 100 may be physically touching (and/or attached to) at least some portion of sidewall 101 when sidewall 101 is in the cool-state (non-fire state). In some embodiments, that at least some portion of sidewall 101 may be an upper interior of sidewall 101 (sidewall-interior 119). In some embodiments, sidewall 101 may comprise cylindrical-sidewall 103 and a conical-sidewall 105, where that at least some portion of sidewall 101 may be at least an interior of conical-sidewall 105. See e.g., FIG. 4B.

Note, the embodiment of housing/can 100 shown in FIG. 4B, utilizing fire-retarding-material 403, may be combined and/or implemented with any of the housing/can 100 embodiments of FIG. 2A to FIG. 3D.

Figure 4C:
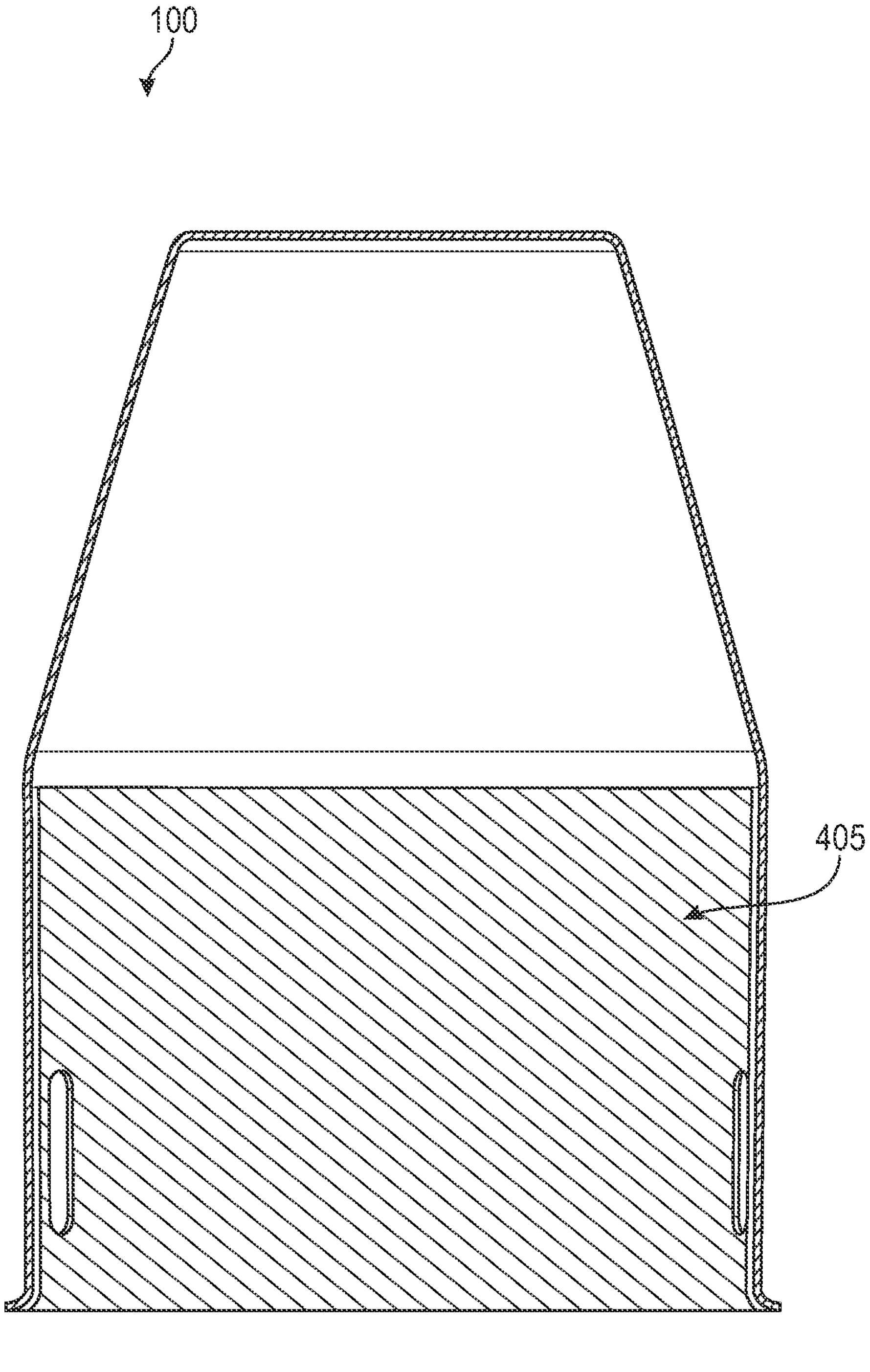
FIG. 4C shows a left-side cross-sectional view through the housing/can of FIG. 1A with an interior fire-retarding-material deployed in a particular fashion on the housing/can.

FIG. 4C shows a left-side cross-sectional view through housing/can 100 with fire-retarding-material 405. In some embodiments, lower (bottom portion) interior surface(s) of housing/can 100 may be covered with fire-retarding-material 405. In some embodiments, fire-retarding-material 405 may be deployed on top of the lower (bottom portion) interior surface(s) of housing/can 100 in at least one layer. In some embodiments, fire-retarding-material 405 may be deployed on top of the lower (bottom portion) interior surface(s) of housing/can 100 in one or more layer(s). In some embodiments, fire-retarding-material 405 may be a shell with a shape that is complimentary (matching) to a lower (bottom portion) interior shape of housing/can 100. In some embodiments, at least most of interior surfaces of fire-retarding-material 405 may be physically touching the lower (bottom portion) interior surfaces of housing/can 100. In some embodiments, fire-retarding-material 405 of housing/can 100 may be of at least a substantially (mostly) uniform thickness.

Continuing discussing FIG. 4C, in some embodiments, the lower (bottom portion) interior surface(s) of sidewall-interior 119 may be covered with fire-retarding-material 405. In some embodiments, fire-retarding-material 405 may be deployed on top of the lower (bottom portion) interior surface(s) of sidewall-interior 119 in at least one layer. In some embodiments, fire-retarding-material 405 may be deployed on top of the lower (bottom portion) interior surface(s) of sidewall-interior 119 in one or more layer(s). In some embodiments, fire-retarding-material 405 may be a shell with a shape that is complimentary to a lower (bottom portion) interior shape of sidewall-interior 119. In some embodiments, at least most of interior surfaces of fire-retarding-material 405 may be physically touching the lower (bottom portion) interior surfaces of sidewall-interior 119. In some embodiments, fire-retarding-material 405 of sidewall-interior 119 may be of at least a substantially (mostly) uniform thickness.

Continuing discussing FIG. 4C, in some embodiments, the interior surface(s) of cylindrical-sidewall 103 may be covered with fire-retarding-material 405. In some embodiments, fire-retarding-material 405 may be deployed on top of the interior surface(s) of cylindrical-sidewall 103 in at least one layer. In some embodiments, fire-retarding-material 405 may be deployed on top of the interior surface(s) of cylindrical-sidewall 103 in one or more layer(s). In some embodiments, fire-retarding-material 405 may be a shell with a shape that is complimentary to an interior shape of cylindrical-sidewall 103. In some embodiments, at least most of interior surfaces of fire-retarding-material 405 may be physically touching the interior surface(s) surfaces of cylindrical-sidewall 103. In some embodiments, fire-retarding-material 405 of cylindrical-sidewall 103 may be of at least a substantially (mostly) uniform thickness.

Continuing discussing FIG. 4C, in some embodiments, fire-retarding-material 405 may not extend to one or more of: interior surface(s) of top 111, interior surface(s) of top-interior 117, conical-sidewall 105 interior surface(s), the upper (top portion) interior surface(s) of sidewall 101, interior surface(s) of sidewall-interior 119, the upper (top portion) interior surface(s) of housing/can 100, portions thereof, combinations thereof, and/or the like. In some embodiments, fire-retarding-material 405 may not physically touch one or more of: interior surface(s) of top 111, interior surface(s) of top-interior 117, conical-sidewall 105 interior surface(s), the upper (top portion) interior surface(s) of sidewall 101, interior surface(s) of sidewall-interior 119, the upper (top portion) interior surface(s) of housing/can 100, portions thereof, combinations thereof, and/or the like. In some embodiments, interior surface(s) of top 111, interior surface(s) of top-interior 117, conical-sidewall 105 interior surface(s), the upper (top portion) interior surface(s) of sidewall 101, interior surface(s) of sidewall-interior 119, the upper (top portion) interior surface(s) of housing/can 100, portions thereof, combinations thereof, and/or the like may be devoid of fire-retarding-material. In some embodiments, at least some of: interior surface(s) of top 111, interior surface(s) of top-interior 117, conical-sidewall 105 interior surface(s), the upper (top portion) interior surface(s) of sidewall 101, interior surface(s) of sidewall-interior 119, the upper (top portion) interior surface(s) of housing/can 100, portions thereof, combinations thereof, and/or the like, may be devoid of fire-retarding-material. In some embodiments, at least most of: interior surface(s) of top 111, interior surface(s) of top-interior 117, conical-sidewall 105 interior surface(s), the upper (top portion) interior surface(s) of sidewall 101, interior surface(s) of sidewall-interior 119, the upper (top portion) interior surface(s) of housing/can 100, portions thereof, combinations thereof, and/or the like, may be devoid of fire-retarding-material.

Continuing discussing FIG. 4C, in some embodiments, the at least one fire-retarding material of housing/can 100 may be physically touching (and/or attached to) at least some portion of sidewall 101 when sidewall 101 is in the cool-state (non-fire state). In some embodiments, that at least some portion of sidewall 101 may be a lower interior of sidewall 101 (sidewall-interior 119). In some embodiments, sidewall 101 may comprise cylindrical-sidewall 103 and a conical-sidewall 105, where that at least some portion of sidewall 101 may be at least an interior of cylindrical-sidewall 103. See e.g., FIG. 4C.

Note, the embodiment of housing/can 100 shown in FIG. 4C, utilizing fire-retarding-material 405, may be combined and/or implemented with any of the housing/can 100 embodiments of FIG. 2A to FIG. 3D.

Figure 4D:
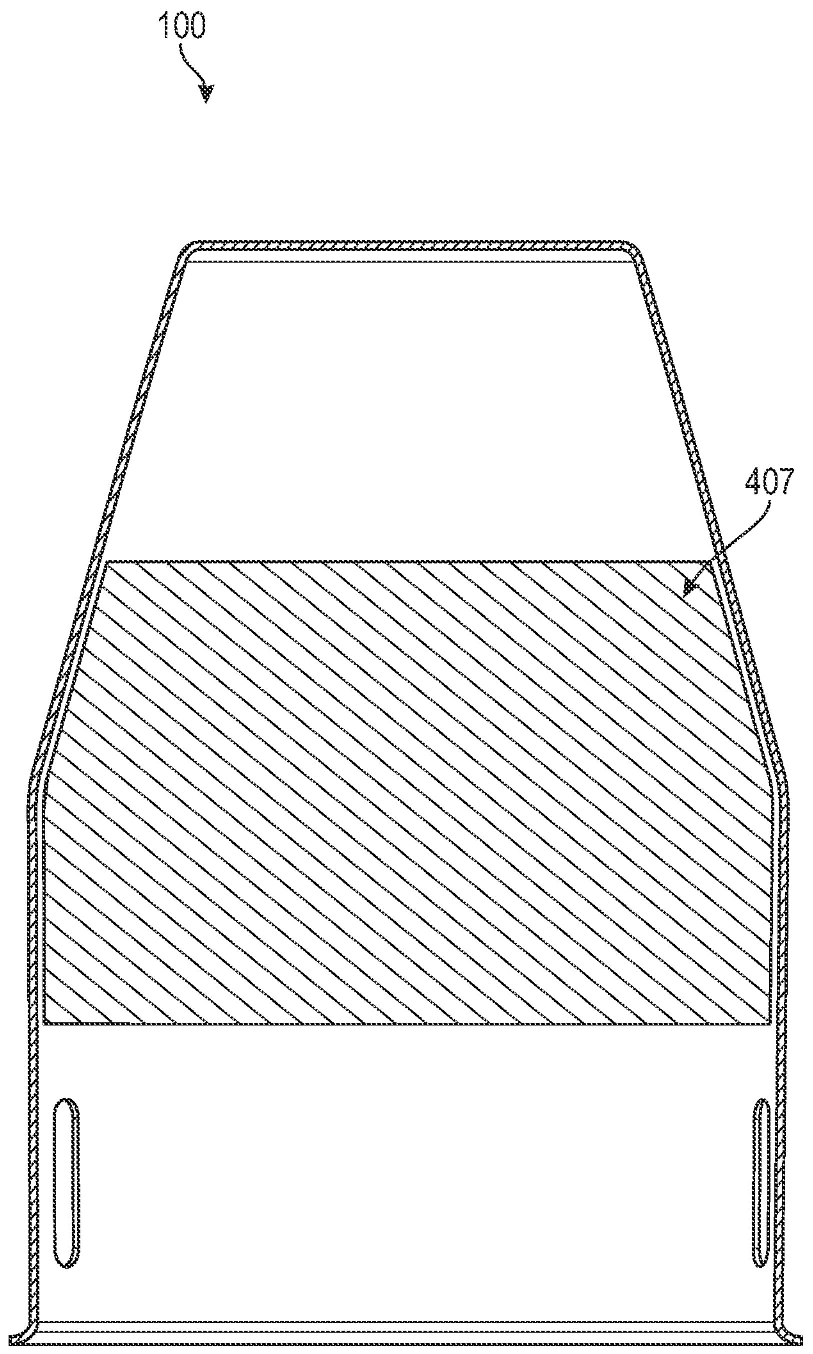
FIG. 4D shows a left-side cross-sectional view through the housing/can of FIG. 1A with an interior fire-retarding-material deployed in a particular fashion on the housing/can.

FIG. 4D shows a left-side cross-sectional view through housing/can 100 with (middle) fire-retarding-material 407. In some embodiments, middle interior surface(s) of housing/can 100 may be covered with (middle) fire-retarding-material 407. In some embodiments, (middle) fire-retarding-material 407 may be deployed on top of the middle interior surface(s) of housing/can 100 in at least one layer. In some embodiments, (middle) fire-retarding-material 407 may be deployed on top of the middle interior surface(s) of housing/can 100 in one or more layer(s). In some embodiments, (middle) fire-retarding-material 407 may be a shell with a shape that is complimentary (matching) to a middle interior shape of housing/can 100. In some embodiments, at least most of interior surfaces of (middle) fire-retarding-material 407 may be physically touching the middle interior surfaces of housing/can 100. In some embodiments, (middle) fire-retarding-material 407 of housing/can 100 may be of at least a substantially (mostly) uniform thickness.

Continuing discussing FIG. 4D, in some embodiments, the middle interior surface(s) of sidewall-interior 119 may be covered with (middle) fire-retarding-material 407. In some embodiments, (middle) fire-retarding-material 407 may be deployed on top of the middle interior surface(s) of sidewall-interior 119 in at least one layer. In some embodiments, (middle) fire-retarding-material 407 may be deployed on top of the middle interior surface(s) of sidewall-interior 119 in one or more layer(s). In some embodiments, (middle) fire-retarding-material 407 may be a shell with a shape that is complimentary to a middle interior shape of sidewall-interior 119. In some embodiments, at least most of interior surfaces of (middle) fire-retarding-material 407 may be physically touching the middle interior surface(s) surfaces of sidewall-interior 119. In some embodiments, (middle) fire-retarding-material 407 of sidewall-interior 119 may be of at least a substantially (mostly) uniform thickness.

Continuing discussing FIG. 4D, in some embodiments, the top interior surface(s) of cylindrical-sidewall 103 and the bottom interior surface(s) of conical-sidewall 105 may be covered with (middle) fire-retarding-material 407. In some embodiments, (middle) fire-retarding-material 407 may be deployed on top of the top interior surface(s) of cylindrical-sidewall 103 and the bottom interior surface(s) of conical-sidewall 105 in at least one layer. In some embodiments, (middle) fire-retarding-material 407 may be deployed on top of the top interior surface(s) of cylindrical-sidewall 103 and the bottom interior surface(s) of conical-sidewall 105 in one or more layer(s). In some embodiments, (middle) fire-retarding-material 407 may be a shell with a shape that is complimentary to an interior shape of the top of cylindrical-sidewall 103 and of the bottom interior shape of conical-sidewall 105. In some embodiments, at least most of interior surfaces of (middle) fire-retarding-material 407 may be physically touching the top interior surfaces of cylindrical-sidewall 103 and the bottom interior surfaces of conical-sidewall 105. In some embodiments, (middle) fire-retarding-material 407 of the top interior surface(s) of cylindrical-sidewall 103 and the bottom interior surface(s) of conical-sidewall 105 may be of at least a substantially (mostly) uniform thickness.

Continuing discussing FIG. 4D, in some embodiments, (middle) fire-retarding-material 407 may not extend to one or more of: interior surfaces of top 111, interior surfaces of top-interior 117, the top interior surfaces of conical-sidewall 105, the upper (top portion) interior upper (top portion) interior surface(s) of housing/can 100, the bottom interior surfaces of cylindrical-sidewall 103, the lower (bottom portion) interior surface(s) of sidewall 101, the lower (bottom portion) interior surface(s) of sidewall-interior 119, the lower (bottom portion) interior surface(s) of housing/can 100, portions thereof, combinations thereof, and/or the like. In some embodiments, (middle) fire-retarding-material 407 may not physically touch one or more of: interior surfaces of top 111, interior surfaces of top-interior 117, the top interior surfaces of conical-sidewall 105, the upper (top portion) interior surface(s) of sidewall 101, the upper (top portion) interior surface(s) of sidewall-interior 119, the upper (top portion) interior surface(s) of housing/can 100, the bottom interior surfaces of cylindrical-sidewall 103, the lower (bottom portion) interior surface(s) of sidewall 101, the lower (bottom portion) interior surface(s) of sidewall-interior 119, the lower (bottom portion) interior surface(s) of housing/can 100, portions thereof, combinations thereof, and/or the like. In some embodiments, interior surfaces of top 111, interior surfaces of top-interior 117, the top interior surfaces of conical-sidewall 105, the upper (top portion) interior surface(s) of sidewall 101, the upper (top portion) interior surface(s) of sidewall-interior 119, the upper (top portion) interior surface(s) of housing/can 100, the bottom interior surfaces of cylindrical-sidewall 103, the lower (bottom portion) interior surface(s) of sidewall 101, the lower (bottom portion) interior surface(s) of sidewall-interior 119, the lower (bottom portion) interior surface(s) of housing/can 100, portions thereof, combinations thereof, and/or the like, may be devoid of fire-retarding-material. In some embodiments, at least some of: interior surfaces of top 111, interior surfaces of top-interior 117, the top interior surfaces of conical-sidewall 105, the upper (top portion) interior upper (top portion) interior surface(s) of housing/can 100, the bottom interior surfaces of cylindrical-sidewall 103, the lower (bottom portion) interior surface(s) of sidewall 101, the lower (bottom portion) interior surface(s) of sidewall-interior 119, the lower (bottom portion) interior surface(s) of housing/can 100, portions thereof, combinations thereof, and/or the like, may be devoid of fire-retarding-material. In some embodiments, at least most of: interior surfaces of top 111, interior surfaces of top-interior 117, the top interior surfaces of conical-sidewall 105, the upper (top portion) interior surface(s) of sidewall 101, the upper (top portion) interior surface(s) of sidewall-interior 119, the upper (top portion) interior surface(s) of housing/can 100, the bottom interior surfaces of cylindrical-sidewall 103, the lower (bottom portion) interior surface(s) of sidewall 101, the lower (bottom portion) interior surface(s) of sidewall-interior 119, the lower (bottom portion) interior surface(s) of housing/can 100, portions thereof, combinations thereof, and/or the like, may be devoid of fire-retarding-material. See e.g., FIG. 4D.

Continuing discussing FIG. 4D, in some embodiments, the at least one fire-retarding material of housing/can 100 may be physically touching (and/or attached to) at least some portion of sidewall 101 when sidewall 101 is in the cool-state (non-fire state). In some embodiments, that at least some portion of sidewall 101 may be a middle interior portion of sidewall 101 (sidewall-interior 119). See e.g., FIG. 4D.

Note, the embodiment of housing/can 100 shown in FIG. 4D, utilizing fire-retarding-material 407, may be combined and/or implemented with any of the housing/can 100 embodiments of FIG. 2A to FIG. 3D.

Note fire-retarding-material(s) deployments on 100 as shown and discussed from FIG. 2A to FIG. 4D may be mixed and matched with each other (as long as such embodiments are not mutually exclusive with each other).

Figure 5:
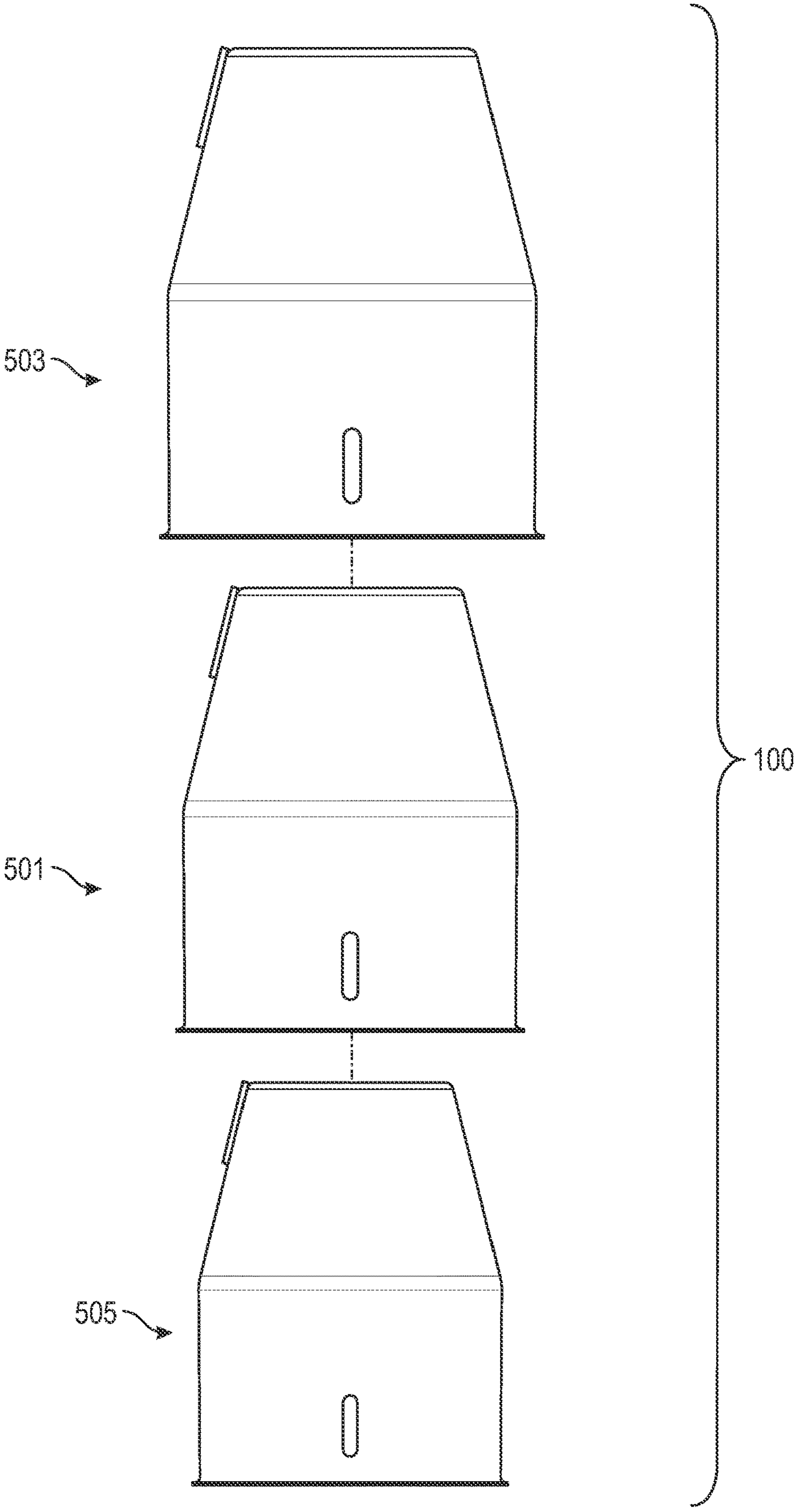
FIG. 5 shows an exploded left-side view of the housing/can of FIG. 1A with a housing/can only portion shown separated (exploded) from at least some of the fire-retarding-material(s).

FIG. 5 shows an exploded left-side view of housing/can 100 with the housing/can 501 portion (of housing/can 100) shown separated from at least some of fire-retarding-material(s) of housing/can 100. FIG. 5 shows an exploded left-side view of a given housing/can 501 that is shown separated from at least some of its fire-retarding-material(s). Note, the included discussions of housing/can 100 and FIG. 1A to FIG. 1J are generally applicable to housing/can 501, except that housing/can 501 is without at least some of its fire-retarding-material(s) and housing/can 100 is with at least some of its fire-retarding-material(s). In some embodiments, housing/can 100 may comprise housing/can 501 and at least one of: exterior-shell 503 (or portion thereof) and/or of interior-shell 505 (or portion thereof). In some embodiments, housing/can 100 may comprise housing/can 501 and exterior-shell 503 (or portion thereof). In some embodiments, housing/can 100 may comprise housing/can 501 and interior-shell 505 (or portion thereof). In some embodiments, housing/can 100 may comprise housing/can 501, exterior-shell 503 (or portion thereof), and interior-shell 505 (or portion thereof).

Continuing discussing FIG. 5, in some embodiments, exterior-shell 503 may be at least substantially constructed from at least one fire-retarding material(s). In some embodiments, exterior-shell 503 may be at least a partial shell that is configured to cover over at least some exterior of housing/can 501. In some embodiments, exterior-shell 503 may be shell that is configured to cover over at least most of the exterior of housing/can 501 (not including the opening to the bottom). In some embodiments, exterior-shell 503 may be larger than housing/can 501. In some embodiments, exterior-shell 503 may be implemented as any one of the embodiments of FIG. 2A to FIG. 3D. For example, in FIG. 2E, exterior-shell 503 would be implemented as two distinct shells, an upper shell and a lower shell. In some embodiments, a shape, geometry, and/or size of exterior-shell 503 may be complimentary to housing/can 501, such that exterior-shell 503 may fit over at least some portion of housing/can 501. In some embodiments, at least some interior surface(s) of exterior-shell 503 may be physically touching and/or attached to at least some exterior surface(s) of housing/can 501. In some embodiments, there may be air gaps between at least some interior surface(s) of exterior-shell 503 and at least some exterior surface(s) of housing/can 501. In some embodiments, exterior-shell 503, when not attached to housing/can 501, may be free-standing and capable of maintaining the shape and the geometry of exterior-shell 503 without attachment to housing/can 501. In some embodiments, exterior-shell 503 and housing/can 501 may be made separately and then inserted together to form housing/can 100. In some embodiments, exterior-shell 503, when not attached to housing/can 501, may not be free-standing and not capable of maintaining the shape and the geometry of exterior-shell 503 without attachment to housing/can 501. In some embodiments, exterior-shell 503 may be made/formed by application (applying to) to housing/can 501 to form housing/can 100.

Continuing discussing FIG. 5, in some embodiments, interior-shell 505 may be at least substantially constructed from at least one fire-retarding material(s). In some embodiments, interior-shell 505 may be at least a partial shell that is configured to fit inside of (into) at least some interior of housing/can 501. In some embodiments, interior-shell 505 may be at least a partial shell that is configured to slide (slip) into at least some interior of housing/can 501. In some embodiments, interior-shell 505 may be shell that is configured to fit inside of (into) at least most of the interior of housing/can 501. In some embodiments, interior-shell 505 may be smaller than housing/can 501. In some embodiments, interior-shell 505 may be implemented as any one of the embodiments of FIG. 4A to FIG. 4D. In some embodiments, a shape, geometry, and/or size of interior-shell 505 may be complimentary to housing/can 501, such that interior-shell 505 may fit inside of (into) at least some interior portion of housing/can 501. In some embodiments, interior-shell 505 may line at least some interior portion(s) of housing/can 501. In some embodiments, at least some outer portion(s) of an internal-volume of housing/can 501 may be at least partially lined with interior-shell 505. In some embodiments, at least some exterior surface(s) of interior-shell 505 may be physically touching and/or attached to at least some interior surface(s) of housing/can 501. In some embodiments, there may be air gaps between at least some exterior surface(s) of interior-shell 505 and at least some interior surface(s) of housing/can 501. In some embodiments, interior-shell 505, when not attached to housing/can 501, may be free-standing and capable of maintaining the shape and the geometry of interior-shell 505 without attachment to housing/can 501. In some embodiments, interior-shell 505 and housing/can 501 may be made separately and then inserted together to form housing/can 100. In some embodiments, interior-shell 505, when not attached to housing/can 501, may not be free-standing and not capable of maintaining the shape and the geometry of interior-shell 505 without attachment to housing/can 501. In some embodiments, interior-shell 505 may be made/formed by application (applying to) to housing/can 501 to form housing/can 100.

Figure 6A:
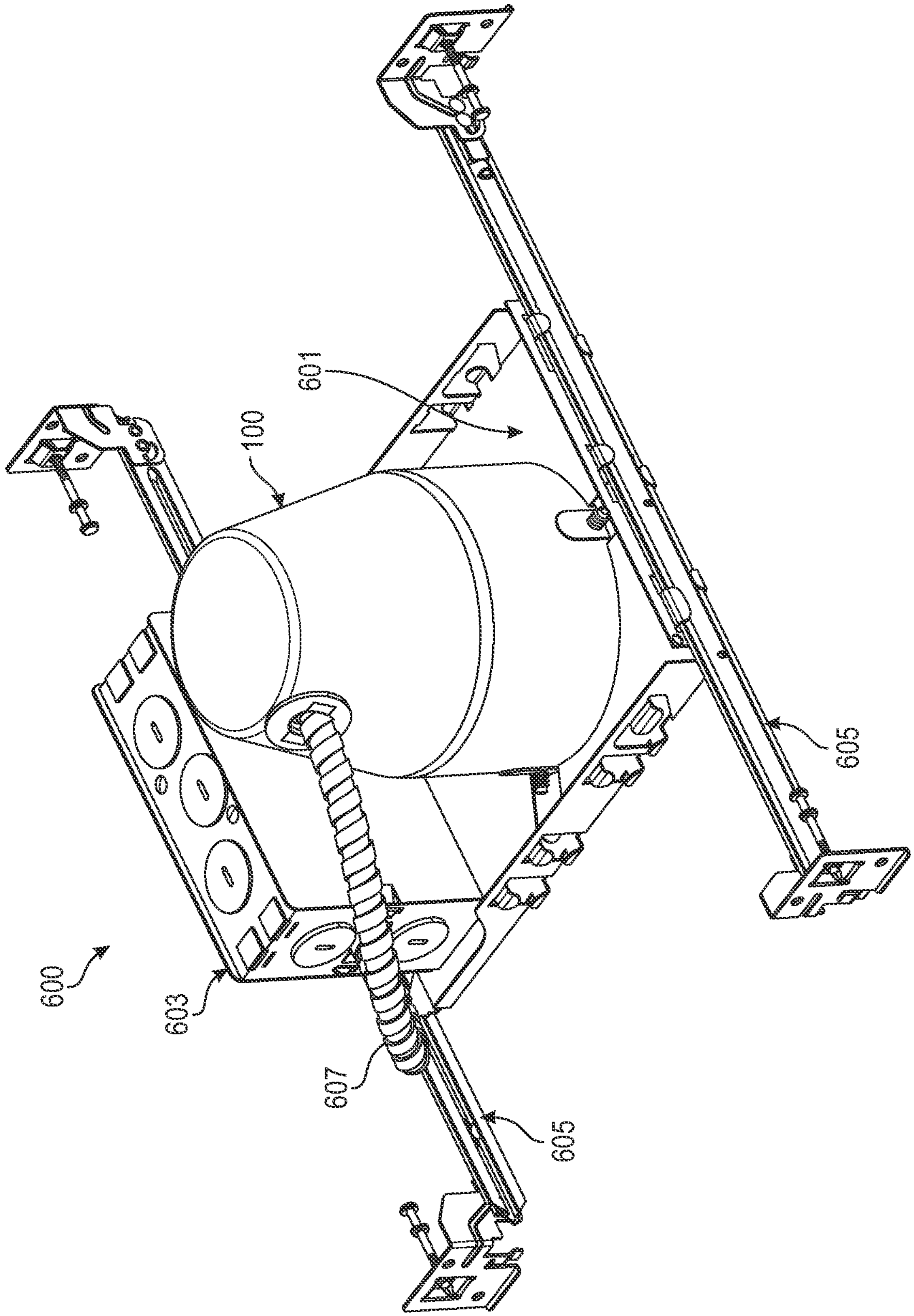
FIG. 6A shows a top-down perspective view of an overall-lighting-assembly that incorporates and/or utilizes the housing/can of FIG. 1A.
Figure 6B:
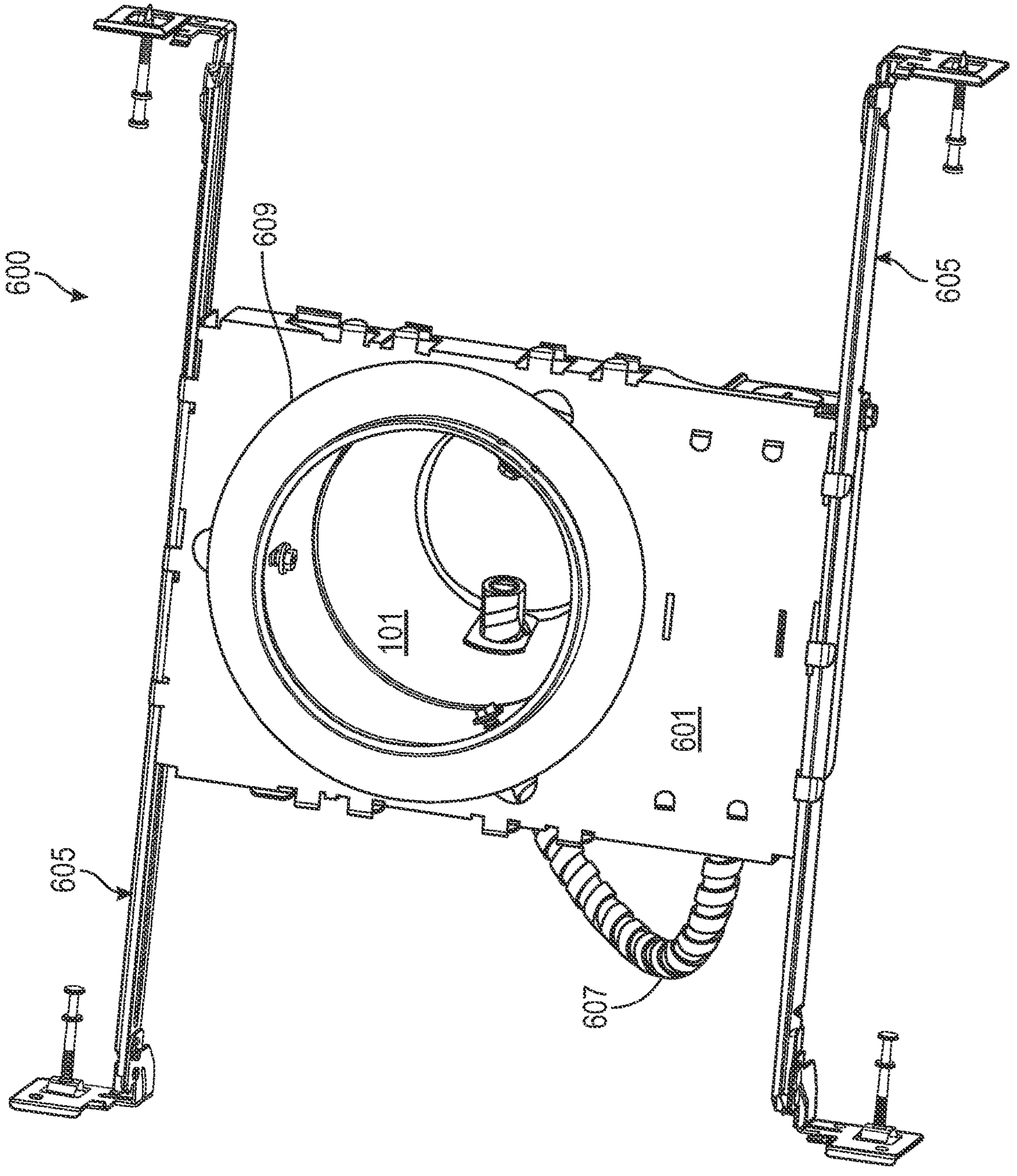
FIG. 6B shows a bottom-up perspective view of the overall-lighting-assembly of FIG. 6A that incorporates and/or the housing/can of FIG. 1A.

FIG. 6A shows a top-down perspective view of an overall-lighting-assembly 600 that incorporates and/or utilizes housing/can 100. FIG. 6B shows a bottom-up perspective view of overall-lighting-assembly 600 that incorporates and/or utilizes housing/can 100. In some embodiments, overall-lighting-assembly 600 may comprise at least one of: housing/can 100, a frame 601, a junction-box 603, a hanger-bar-subassembly 605, and a flex-conduit 607. In some embodiments, overall-lighting-assembly 600 may also comprise a gasket 609.

Continuing discussing FIG. 6A and FIG. 6B, in some embodiments, housing/can 100 may be attached to frame 601. In some embodiments, frame 601 may be a structural member. In some embodiments, frame 601 may be at least substantially (mostly) rigid. In some embodiments, frame 601 may be made at least substantially from one metal and/or metal alloy. In some embodiments, at least some exterior surfaces of frame 601 may be galvanized or the like. In some embodiments, frame 601 may be mostly a substantially (mostly) flat and planar member, with a large central hole (for receiving a portion of housing/can 100). In some embodiments, frame 601 may have a plurality of attachment regions, configured for attaching to housing/can 100, junction-box 603, and/or hanger-bar-subassembly 605. In some embodiments, at least some perimeter edges of frame 601 may be upturned. In some embodiments, frame 601 may be sized and/or dimensioned to fit between two adjacent (and likely parallel) (ceiling) joists.

Continuing discussing FIG. 6A and FIG. 6B, in some embodiments, junction-box 603 may be a junction box, as that term is used in the lighting industry. In some embodiments, junction-box 603 may house any needed (or desired) electrical (power) connections from a source external to overall-lighting-assembly 600 and for providing electrical power for electronics within housing/can 100. In some embodiments the electronics within housing/can 100 may comprise one or more of: the at least one light emitting element (such as, but not limited to, a LED chip), a driver, and/or a heat sink. In some embodiments, junction-box 603 may be attached to frame 601. In some embodiments, junction-box 603 may be located on top of frame 601.

Continuing discussing FIG. 6A and FIG. 6B, in some embodiments, hanger-bar-subassembly 605 may be configured for attachment to both frame 601 and to two (2) different adjacent (ceiling) joists or the like. In some embodiments, hanger-bar-subassembly 605 may be an elongate member. In some embodiments, hanger-bar-subassembly 605 may be telescoping (linearly sliding) member. In some embodiments, opposing terminal ends portions of hanger-bar-subassembly 605 may be configured for attachment to two (2) different adjacent (ceiling) joists or the like; and middle portion(s) of hanger-bar-subassembly 605 may be attached to frame 601. In some embodiments, each overall-lighting-assembly 600 may comprise two (2) hanger-bar-subassemblies 605.

Continuing discussing FIG. 6A and FIG. 6B, in some embodiments, flex-conduit 607 may provide a protected pathway for wire(s) and/or cable(s) from junction-box 603 to the electronic(s) within housing/can 100. In some embodiments, flex-conduit 607 may be flexible, hollow, cylindrical, and/or elongate member. In some embodiments, flex-conduit 607 may run from at least junction-box 603 to housing/can 100. In some embodiments, flex-conduit 607 may house wire(s) and/or cable(s).

Discussing FIG. 6B, in some embodiments, gasket 609 may be a gasket. In some embodiments, gasket 609 may be an annular ring type gasket. In some embodiments, gasket 609 may be an annular flat-ring type gasket. In some embodiments, gasket 609 may be an annular O-ring type gasket. In some embodiments, gasket 609 may be made substantially from at least one elastomer and/or plastic. In some embodiments, gasket 609 may be configured to seal around where housing/can 100 mates against the large central hole of frame 601. In some embodiments, gasket 609 may reside between an exterior of housing/can 100 and the large central hole of frame 601.

The following thirteen (13) paragraphs notes distinctions of housing/can 100 from prior art U.S. utility patents 7,320,536; 7,670,033; 9,512,994; 9,752,765; 9,784,443; and 9,890,944.

In prior art U.S. utility patent 7,320,536 to Petrakis et al., his "intumescent layer 114" is deployed on his "outer surface 112" of his "trim 104" part/component in the cool-state (non-fire state) and not on his "internal housing 110." In U.S. utility patent 7,320,536 there is an air gap between his "intumescent layer 114" and his "internal housing 110" in the cool-state (non-fire state). See e.g., U.S. utility patent 7,320,536 FIG. 1. Structurally and/or functionally, U.S. utility patent 7,320,536 "internal housing 110" is most analogous to housing/can 100 of the present invention; except that U.S. utility patent 7,320,536 "internal housing 110" has no fire-retarding material(s) associated with U.S. utility patent 7,320,536 "internal housing 110." U.S. utility patent 7,320,536, there is no intumescent layer that physically touches his "internal housing 110" in the cool-state (non-fire state). "Trim 104" of U.S. utility patent 7,320,536 that has his "intumescent layer 114" is deployed on his "outer surface 112" of his "trim 104" in the cool-state (non-fire state), is structurally and geometrically different from housing/can 100 of the present invention. For example, and without limiting the scope of the present invention: housing/can 100 may more than twice as tall as compared to a trim component/part; housing/can 100 may be at least mostly closed on a top of housing/can 100, whereas, a trim component/part will be open at its top; housing/can 100 is without a bottom flat annular flange that is visible from below, whereas, a trim component/part will have a bottom flat annular flange that is visible from below; and/or generally once housing/can 100 is installed above a ceiling, no portion of housing/can 100 is visible from below that ceiling, whereas, once a trim component/part is installed in the ceiling the trim's bottom flat annular flange is visible from below that ceiling and portions of that trim's reflector are also visible from below that ceiling (if that trim had an integrated reflector). In some embodiments, housing/can 100 may be without a trim component/part. In some embodiments, housing/can 100 may be without a trim component/ part that is in physical communication with a fire retarding material in the cool-state (non-fire state). In some embodiments, housing/can 100 may be without (free of/devoid of) one or more of: a flange, a bottom flange, an annular flange, and/or a bottom annular flange, and/or the like similar structures that are typical of trim components/parts.

In prior art U.S. utility patent 7,670,033 to Steer et al., Steer's "intumescent material 36" is located on the bottom inside of his outermost "square-shaped enclosure 24" in a cool-state (non-fire state). In U.S. utility patent 7,670,033, in the cool-state (non-fire state), his "intumescent material 36" does not physically touch his lighting "can 20." U.S. utility patent 7,670,033 teaches a double hulled deployment with his lighting "can 20" being located inside of his outermost "square-shaped enclosure 24". See e.g., U.S. utility patent 7,670,033 FIG. 2. U.S. utility patent 7,670,033 "square-shaped enclosure 24" is not structurally nor functionally analogous to housing/can 100 of the present invention. U.S. utility patent 7,670,033 "square-shaped enclosure 24" would be like adding in an additional enclosure to cover over housing/can 100 of the present invention. Whereas, U.S. utility patent 7,670,033 lighting "can 20" is more structurally and/or functionally analogous to at least some aspects of housing/can 100 of the present invention. Except that in U.S. utility patent 7,670,033 his lighting "can 20" has no intumescent material or the like physically touching his lighting "can 20" in the cool-state (non-fire state). In U.S. utility patent 7,670,033 lighting "can 20" and in housing/can 100 of the present invention the light emitting element is located directly/immediately within U.S. utility patent 7,670,033 lighting "can 20" (e.g., his "light bulb 42") or within housing/can 100 of the present invention. In some embodiments, fire-retarding-material(s) of the present invention, in a cool-state (non-fire state), is/are physically touching at least some portion of housing/can 100; whereas, in U.S. utility patent 7,670,033 Steer's "intumescent material 36" is not physically touching any portion of Steer "can 20," see e.g., U.S. utility patent 7,670,033 FIG. 2. In some embodiments, fire-retarding-material(s) of the present invention, in a cool-state (non-fire state), is/are not physically touching an inside/interior upper/top portion of housing/can 100.

In prior art U.S. utility patents 9,512,994, 9,752,765, and 9,784,443 to Rashidi Doust, his "intumescent disc 13" sits at the inside bottom of his "housing 1" and without his "intumescent disc 13" physically touching his "housing 1," in the cool-state (non-fire state). In U.S. utility patents 9,512,994, 9,752,765, and 9,784,443 his "intumescent disc 13" is not physically touching any portion of his "housing 1" in the cool-state (non-fire state). In U.S. utility patents 9,512,994, 9,752,765, and 9,784,443 there is an air gap between his "intumescent disc 13" and his "housing 1," in the cool-state (non-fire state). See e.g., FIG. 2A and FIG. 2B from U.S. utility patents 9,512,994, 9,752,765, and 9,784,443. Structurally and/or functionally, U.S. utility patents 9,512,994, 9,752,765, and 9,784,443 "housing 1" is most analogous to housing/can 100 of the present invention; except that in U.S. utility patents 9,512,994, 9,752,765, and 9,784,443 "housing 1" has no fire-retarding material(s) physically touching U.S. utility patents 9,512,994, 9,752,765, and 9,784,443 "housing 1" in the cool-state (non-fire state). In U.S. utility patents 9,512,994, 9,752,765, and 9,784,443 a majority of the surface area of his "intumescent disc 13" runs in a horizontal direction, wherein that horizontal direction is orthogonal (perpendicular) to the overall length of his "housing 1." See e.g., FIG. 2A, FIG. 2B, and FIG. 6 from U.S. utility patents 9,512,994, 9,752,765, and 9,784,443.

In some embodiments, a majority of the surface area of the fire-retarding-material(s) of the present invention may run in a substantially (mostly) vertical direction of housing/can 100. In some embodiments, the majority of the surface area of the fire-retarding-material(s) of the present invention may not run in a substantially horizontal direction, wherein the horizontal direction may be substantially orthogonal (perpendicular) with a vertical-center-axis (vertical-center-longitudinal line) of housing/can 100. In some embodiments, the only portion(s) of the surface area of the fire-retarding-material(s), of the present invention, of housing/can 100, that may run in the horizontal direction, are those portion(s) associated with top 111 of housing/can 100; and these horizontal portion(s) are not a majority of the surface area of the fire-retarding-material(s), of the present invention, of housing/can 100. See e.g., FIG. 2A to FIG. 4D.

In U.S. utility patents 9,512,994, 9,752,765, and 9,784,443 his "intumescent disc 13" has various slots "27" ("heat vents 27") that run in the horizontal direction, wherein that horizontal direction is orthogonal (perpendicular) to the overall length of his "housing 1." See e.g., FIG. 2A, FIG. 2B, and FIG. 6 from U.S. utility patents 9,512,994, 9,752,765, and 9,784,443.

In some embodiments, the fire-retarding-material(s) of the present invention do not have any slots that run in the horizontal direction; wherein the horizontal direction may be substantially orthogonal (perpendicular) with a vertical-axis of housing/can 100. See e.g., FIG. 2A to FIG. 4D.

In prior art U.S. utility patents 9,512,994, 9,752,765, and 9,784,443 to Rashidi Doust, his "intumescent ring 7" sits at an outside bottom portion of his "housing 1" and his "intumescent ring 7" physically touches the outside bottom portion of his "housing 1," in the cool-state (non-fire state). See e.g., FIG. 2A and FIG. 2B from U.S. utility patents 9,512,994, 9,752,765, and 9,784,443. In U.S. utility patents 9,512,994, 9,752,765, and 9,784,443 a height of his "intumescent ring 7" may not extend upwards to a middle region of his "housing 1" with respect to an overall height/length of his "housing 1" in the cool-state (non-fire state). See e.g., FIG. 2A from U.S. utility patents 9,512,994, 9,752,765, and 9,784,443. In some embodiments, the fire-retarding-material(s) of the present invention, may extend to and/or physically touch a middle region of housing/can 100 in the cool-state (non-fire state).

In U.S. utility patents 9,512,994, 9,752,765, and 9,784,443 a height of his "intumescent ring 7" is 10% or less of the overall height/length of his "housing 1." See e.g., FIG. 2A from U.S. utility patents 9,512,994, 9,752,765, and 9,784,443. A height of 15% or less of the fire-retarding-material(s) (when associated with housing/can 100), of the present invention, with respect to the overall height/length of housing/can 100 may be insufficient to yield a desired fire-rating. In some embodiments, a height of fire-retarding-material(s) (when associated with housing/can 100), of the present invention, may be 20% or more with respect to the overall height/length of housing/can 100.

In U.S. utility patents 9,512,994, 9,752,765, and 9,784,443 his "intumescent ring 7" has a major exterior surface (e.g., exterior sidewall) and an inside major interior surface (e.g., interior sidewall), wherein his major exterior surface is parallel to his inside major interior surface. The top and bottom of his "intumescent ring 7" having the minor surfaces. See e.g., FIG. 7 from U.S. utility patents 9,512,994, 9,752,765, and 9,784,443.

In some embodiments, major surfaces of housing/can 100 may comprise surfaces of: top 111, top-interior 117, sidewall 101 (exterior and/or interior), cylindrical-sidewall 103 (exterior and/or interior), and/or conical-sidewall 105 (exterior and/or interior). In some embodiments, at least some portion(s) of the major surfaces of housing/can 100 may have fire-retarding-material(s) of the present invention attached and/or physically touching thereto. In some embodiments, the major surfaces of top 111 and/or of top-interior 117 may be not parallel with major surfaces of sidewall 101, cylindrical-sidewall 103, and/or conical-sidewall 105. In some embodiments, the fire-retarding-material(s) of the present invention may have two or more major surfaces that are not parallel with each other, such as, surface(s) of top 111, and/or of top-interior 117 not being parallel with major surfaces of sidewall 101, cylindrical-sidewall 103, and/or conical-sidewall 105.

U.S. utility patents 9,512,994, 9,752,765, and 9,784,443 have "u-shaped channels 30" in his "intumescent ring 7" that are open at the top and closed at the bottom, extending from the top towards the bottom, without touching his bottom of his "intumescent ring 7." See e.g., FIG. 7 from U.S. utility patents 9,512,994, 9,752,765, and 9,784,443. In some embodiments, any hole(s), slot(s), and/or channel(s) in the fire-retarding-material(s) of the present invention (e.g., slot(s) 113 and/or hole(s) 114) may not be open at the top. In some embodiments, any hole(s), slot(s), and/or channel(s) in the fire-retarding-material(s) of the present invention (e.g., slot(s) 113 and/or hole(s) 114) may be closed at the top and closed at the bottom.

In prior art U.S. utility patent 9,890,944 to Chou, his intumescent materials 112/112A/112B are materials added on top of his bottom exterior portions of his "casing 102" (which is a trim component) in the cool-state (non-fire state). See e.g., FIG. 1A and FIG. 1B of U.S. utility patent 9,890,944. U.S. utility patent 9,890,944 has no part comparable to housing/can 100 of the present invention. U.S. utility patent 9,890,944 does not teach any fire retarding material in physical communication with a housing/can like structure, in the cool-state (non-fire state).

In some embodiments, housing/can 100 may be without a trim component/part. In some embodiments, housing/can 100 may be without a trim component/part that is in physical communication with a fire retarding material in the cool-state (non-fire state). In some embodiments, housing/can 100 may be without (free of/devoid of) one or more of: a flange, a bottom flange, an annular flange, and/or a bottom annular flange, and/or the like similar structures that are typical of trim components/parts.

A lighting housing-with-fire-retarding-material and an overall-lighting-assembly which incorporates such a lighting housing-with-fire-retarding-material have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fire rated lighting housing, the housing comprising:

a bottom that is open;

a top that is at least substantially closed or entirely closed;

a sidewall that runs from the bottom to the top; and at least one fire-retarding material that is physically touching at least some portion of the sidewall when the sidewall is in a cool-state; wherein the cool-state is when a temperature of the housing is at or below a predetermined normal operating temperature for the housing; wherein the at least one fire-retarding material is configured to slow an elevation of the temperature above the predetermined normal operating temperature to achieve a predetermined fire rating for the housing;

wherein a thickness of the at least one fire-retarding material is variable along the at least some portion of the sidewall;

wherein the at least some portion of the sidewall is an entire exterior of the sidewall;

wherein the thickness is thicker towards the bottom and thinner towards the top or wherein the thickness is thicker towards a middle of the sidewall, thinner towards the bottom, and also thinner towards the top; and wherein the top and the sidewall at least substantially enclose an internal-volume, wherein the internal-volume is configured to directly house at least one light emitting element.

2. The fire rated lighting housing according to claim 1, wherein the sidewall comprises a cylindrical-sidewall and a conical-sidewall.

3. The fire rated lighting housing according to claim 1, wherein the at least some portion of the sidewall is also an entire interior of the sidewall.

4. The fire rated lighting housing according to claim 1, wherein the at least some portion of the sidewall is also an upper interior of the sidewall.

5. The fire rated lighting housing according to claim 1, wherein the sidewall comprises a cylindrical-sidewall and a conical-sidewall, where the at least some portion of the sidewall is also at least an interior of the conical-sidewall.

6. The fire rated lighting housing according to claim 1, wherein the at least some portion of the sidewall is also a lower interior of the sidewall.

7. The fire rated lighting housing according to claim 1, wherein the sidewall comprises a cylindrical-sidewall and a conical-sidewall, where the at least some portion of the sidewall is also at least an interior of the cylindrical-sidewall.

8. The fire rated lighting housing according to claim 1, wherein the at least some portion of the sidewall is also a middle interior portion of the sidewall.

9. The fire rated lighting housing according to claim 1, wherein the at least one fire-retarding material is at least one layer of silica fiberglass fabric.

10. The fire rated lighting housing according to claim 1, wherein the at least one fire-retarding material is in a form of one or more of: a fabric, a tape, a wrap, a foam, a sheet, a layer, a skin, a shell, a cup, a cover, a collar, a band, a paint, a layer from dipping, a gel, a paste, a putty, a clay, a mud, portions thereof, or combinations thereof.

11. The fire rated lighting housing according to claim 1, wherein the at least one fire-retarding material is selected from one or more of: a glass, a ceramic, portions thereof, or combinations thereof.

12. The fire rated lighting housing according to claim 1, wherein the predetermined fire rating for the housing is at least one (1) hour.

13. The fire rated lighting housing according to claim 1, wherein the at least one light emitting element is at least one light emitting diode.

14. The fire rated lighting housing according to claim 1, wherein the housing at the bottom is without a substantially flat annular flange that if present would function as a trim component.

15. The fire rated lighting housing according to claim 1, when the housing is in use such that the housing is directly housing the at least one light emitting element, the housing achieves the predetermined fire rating without being covered by an outermost enclosure.

* * * * *